Jan. 28, 1941.   R. L. MULLER   2,229,764
CALCULATING MACHINE
Filed Feb. 5, 1936   12 Sheets-Sheet 4

INVENTOR
Robert L. Muller
BY
Dans, Lindsey, Smith & Shints
ATTORNEYS

Jan. 28, 1941.  R. L. MULLER  2,229,764
CALCULATING MACHINE
Filed Feb. 5, 1936   12 Sheets-Sheet 6

INVENTOR
Robert L. Muller
BY
ATTORNEYS

Jan. 28, 1941.   R. L. MULLER   2,229,764
CALCULATING MACHINE
Filed Feb. 5, 1936   12 Sheets-Sheet 11

INVENTOR
Robert L. Muller
BY
Davis, Lindsey, Smith, & Hunt
ATTORNEYS

Patented Jan. 28, 1941

2,229,764

UNITED STATES PATENT OFFICE 2,229,764

CALCULATING MACHINE

Robert L. Muller, Detroit, Mich., assignor to Burroughs Adding Machine Company, Detroit, Mich., a corporation of Michigan Application February 5, 1936, Serial No. 62,393

4 Claims. (Cl. 235—60)

This invention relates to a calculating machine, and it is concerned particularly with automatic controls for conditioning the machine for different operations.

Calculating machines are usually conditioned for different operations by means of special manually operated keys, or levers, or by having a paper carriage automatically actuate certain parts to condition the machine. One of the difficulties with having the paper carriage actuate the controls is that it places a load upon the carriage that interferes with its proper operation. For example, if there are no controls to be actuated in several columns of the carriage, the carriage will move freely and rapidly in these columns but, if, in other columns, there are a number of controls to be actuated, and this number varies, the carriage is loaded up in varying amounts and will move slowly, or sluggishly, or erratically. The present invention has been devised to overcome this difficulty.

The general object of the invention is to provide an improved automatic control for conditioning a calculating machine for different operations.

A more particular object is to provide a machine in which while automatic means is provided to index the machine, the controls are actuated by power so that the carriage is relieved of the load of actuating the controls.

More specifically, the object of the invention is to provide a machine in which a function indexing means is automatically indexed after which this means is sensed by a means that conditions the machine for the desired operation.

Other objects and advantages of the invention will appear from the following specification and drawings.

An embodiment of the invention is shown in the accompanying drawings, in which.

Figure 1:
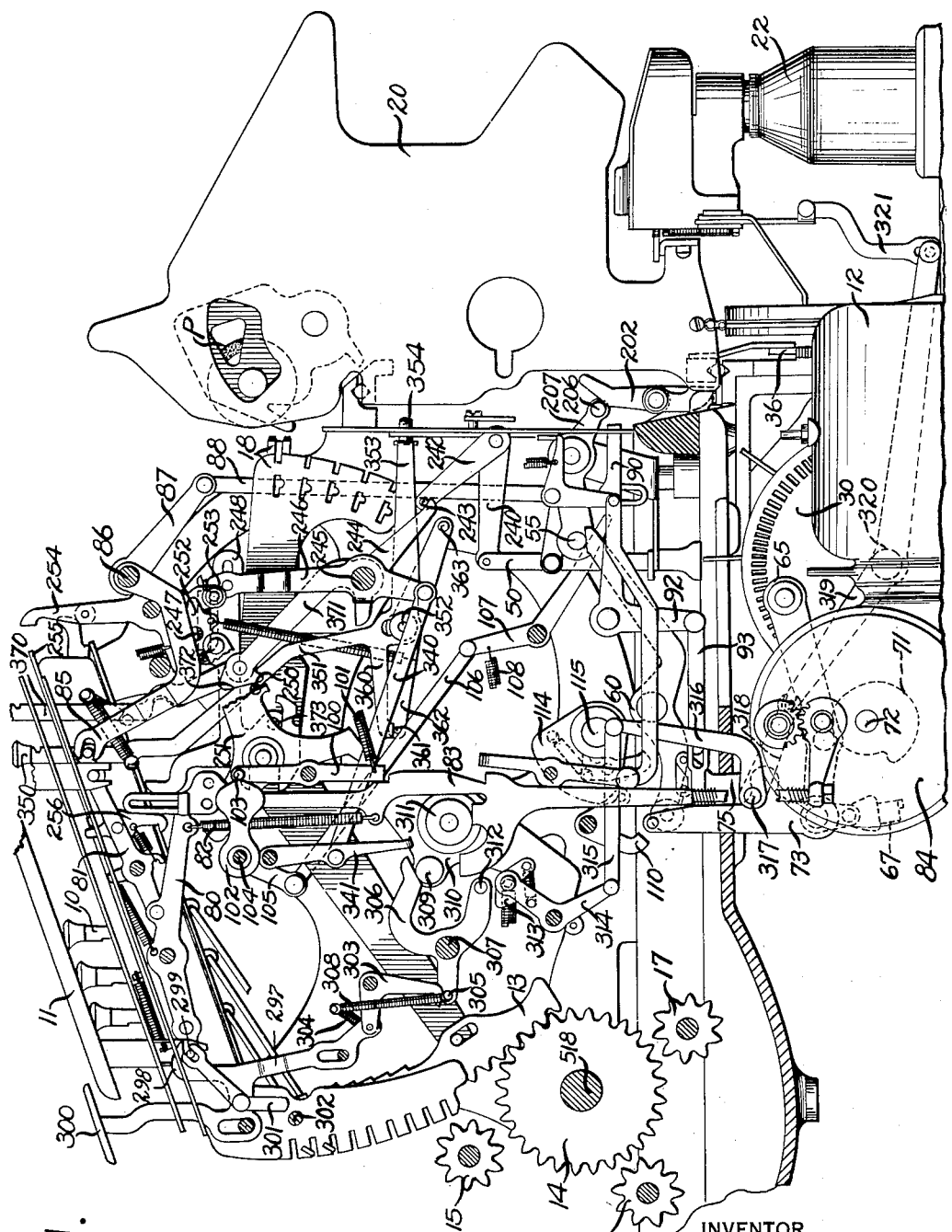
Figure 1 is a right side elevation of a machine with the invention applied thereto, certain parts being cut away to show others more clearly, and with the parts in normal position.

This application is a continuation-in-part of my application Serial No. 35,433, filed August 9, 1935. The invention is shown applied to a Burroughs calculating machine of a type that is well known so that a detailed description is not necessary. It will be understood that the invention can also be used with other types of machines.

General machine construction

The machine is provided with a plurality of depressible amount keys 10 (Fig. 1) upon which items may be entered after which the machine can be operated by depressing a motor bar 11 that causes a motor 12 to give the machine a cycle of operation which includes a forward and a return stroke. During this cycle, the machine performs certain functions depending upon how it is conditioned.

The amount keys control the position of racks 13 which mesh with large gears or actuators 14, with which a main register 15 and two multiple registers 16 and 17 are adapted to cooperate.

A printing mechanism, including the type bars 18, is operated near the end of the forward stroke of the machine to print the items entered or the calculation performed.

Figure 3:
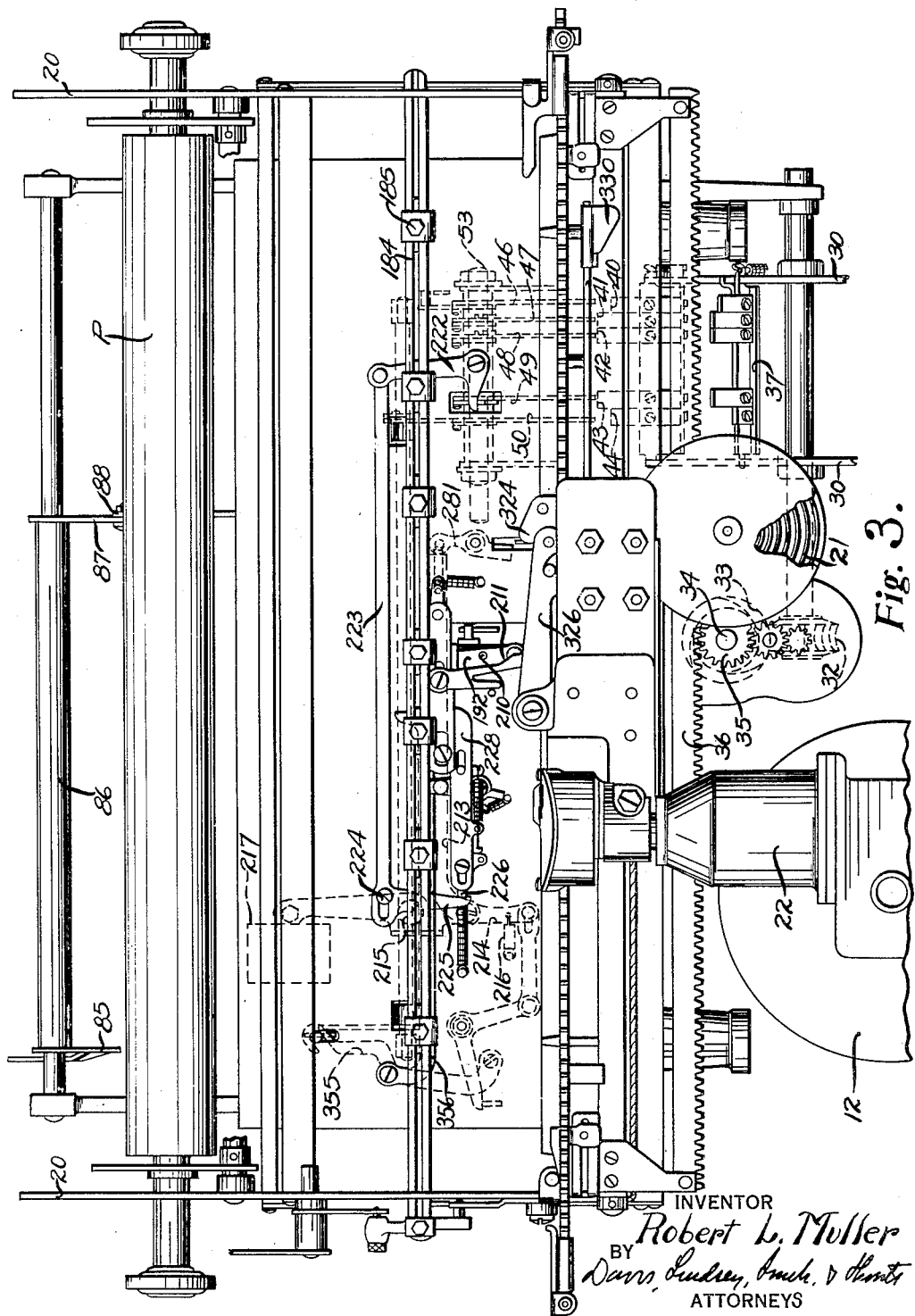
Fig. 3 is a rear elevation showing particularly the manner in which the paper carriage is controlled and some of the parts that are set by said carriage.
Figure 8:
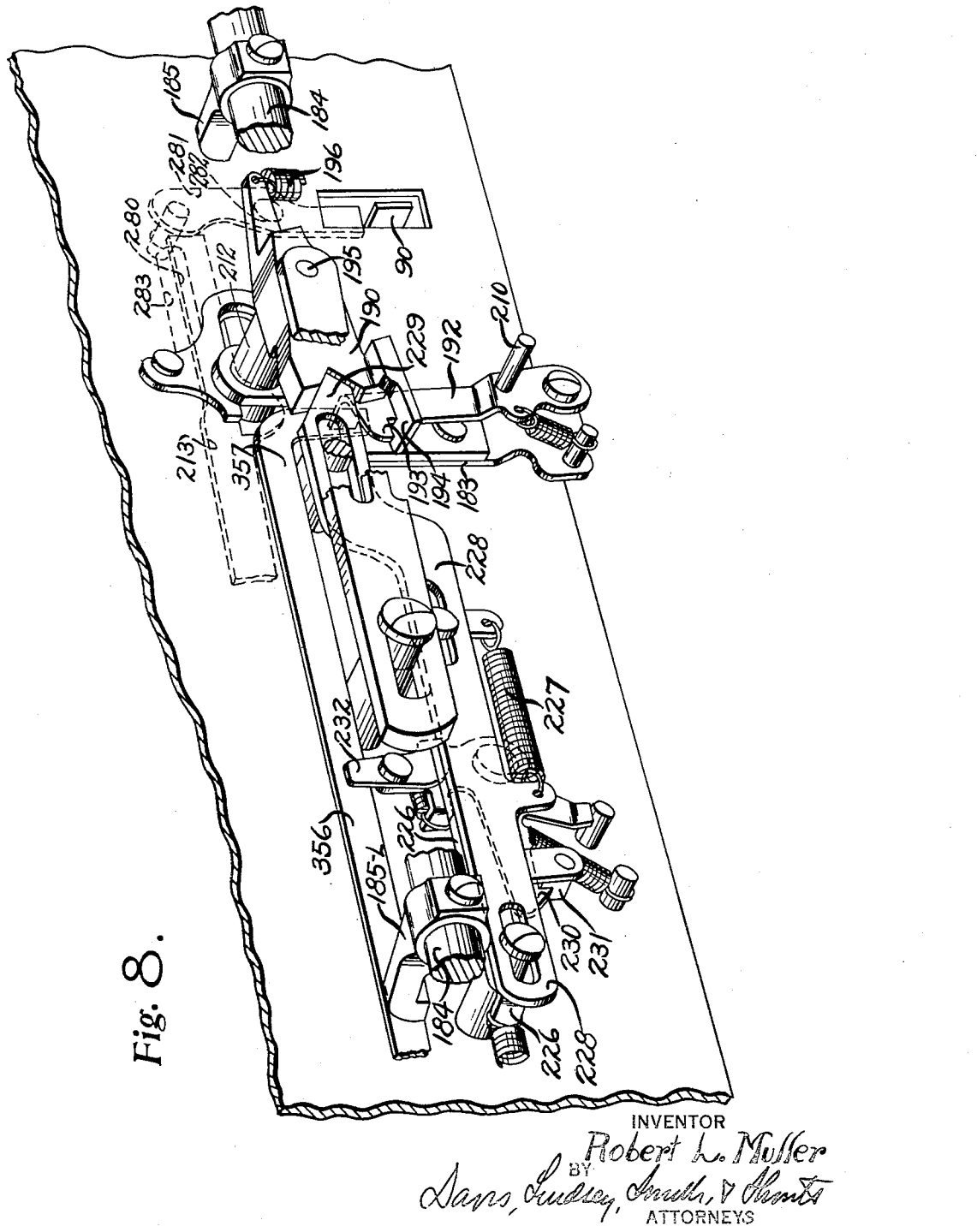
Fig. 8 is a perspective view of the tabulating mechanism.

The machine is provided with a platen P about which paper may be held in printing position relative to the printing mechanism. Provision is also made for causing printing to occur in different columns on the paper. This is accomplished by supporting the platen on a traveling paper carriage 20 controlled by a tabulating mechanism of which portions are shown in Fig. 8 and which will be described in more detail later. This tabulating mechanism is normally operated during the latter part of each cycle of operation of the machine to release the carriage for movement to the next column under the urge of a spring 21 (Fig. 3). The carriage can be returned automatically by power through a carriage return mechanism 22 of the type described in Rinsche Patent No. 1,580,534.

Function indexing means

Instead of having the paper carriage actuate parts to condition the machine to perform different functions, the carriage merely controls a very light indexing means which places scarcely any load upon the carriage. This makes possible a lighter and faster moving carriage and one that may be started and stopped quickly in either direction. Also, the load on the carriage remains the same for all its movements.

The indexing means is in the form of a rotatable drum 30 (Fig. 2) mounted upon a shaft 31 carrying a worm wheel 32 meshing with a worm 33 fixed to a shaft 34. Fixed to the end of shaft 34 is a gear 35 that meshes with a rack 36 (Fig. 3) fixed to the paper carriage. It will thus be seen that the drum 30 rotates as the carriage is moved, and occupies various indexed positions, or stations, depending upon the columnar position of the carriage.

Figure 13:
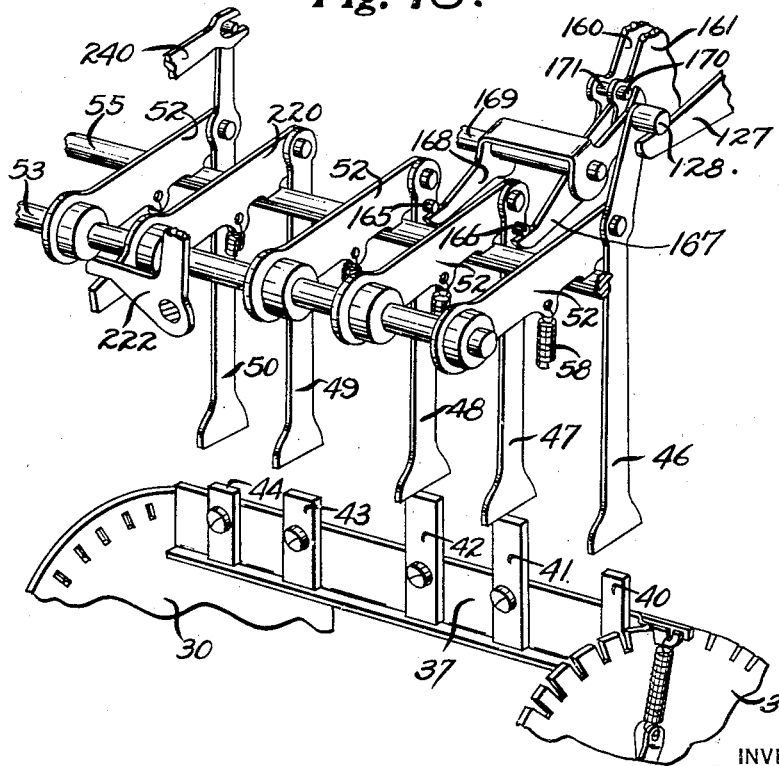
Fig. 13 is a perspective view of certain portions of the indexing and sensing means.

The indexing drum has a series of cross members 37 (Figs. 3 and 13) to which are detachably connected a series of indexing, or abutment stops, of which five are shown on the cross bar illustrated in Figs. 3 and 13, numbered 40, 41, 42, 43 and 44. These stops are of various lengths and the number of them, their location, and the height of the stops in the various positions can be changed to suit the requirements. In each of the columnar positions of the carriage, the indexing drum is brought to a position, or station, where one of the cross bars, with the appropriate stops on it, is in active, or indexed, position so that the stops may be "sensed," or "felt" by a sensing or a function conditioning means to be described later.

In other words, an indexing means is set in accordance with the column in which printing is to occur after which the indexing means is "sensed" by a means which, in the form of the invention disclosed, is a mechanical "feeling" mechanism.

Sensing means

As mentioned, the machine is conditioned to perform different functions by power and without using the power of carriage travel for the purpose. Said power operated mechanism is in the form of a mechanism that will feel, or sense, the indexing means.

The term "function" as used herein, is not intended to include only calculating functions such as addition or subtraction, but also functions such as repeat operations of the machine, skip-tab operations, control of the printing mechanism, and similar functions.

For the purpose of sensing the indexing means, a series of vertically movable members, or links, are provided, five being shown in the present embodiment of the invention and numbered 46, 47, 48, 49 and 50, as shown in Figs. 3 and 13. These sensing members are guided at their lower ends by a plate 51 (Fig. 2) and, at their upper ends, are connected to arms 52 of which there is one for each of the members. The arms 52 are pivoted on a stationary shaft 53 near the rear of the machine. Those sensing members are normally held in elevated position by means of a shaft, or bail, 55 that engages the undersides of the arms. The shaft 55 is carried by side arms 56 pivoted on the shaft 53 and a spring 57 serves to urge the bail in a clockwise direction as viewed in Fig. 2. Also, springs 58 of which there is one attached to each of the arms 52, serve to urge the arms in a clockwise direction so that said arms 52 with the sensing members 46–50 are urged clockwise by power to a "feeling" or "sensing" position.

The bail 55 is held upward by means of a lever 60 (Fig. 4) pivoted on a shaft 61. The rear end of this lever is positioned under the bail 55 and its forward end is connected to a downwardly extending link 62 whose lower end has a slot 63 in which is positioned a stud 64 carried by a lever 65 pivoted on a stationary stud 66. The lever 65 is urged counterclockwise as viewed in Fig. 4 by a relatively strong spring 67 connected to it by plates 68, but it is normally held against movement by the engagement of a stud 70 on the lever with the edge of a cam 71 fixed to a shaft 72 that is rotated one revolution during each cycle of operation of the machine. Pivotally connected to the stud 64 on the lever 65 is a second link 73 whose upper end has a stud and slot connection 74 with the link 62. The link 73 carries a latch 75 urged counterclockwise as viewed in Fig. 4 by a spring 76 to cause a lug 77 on the latch to engage over a shoulder 78 on the link 62.

Figure 4:
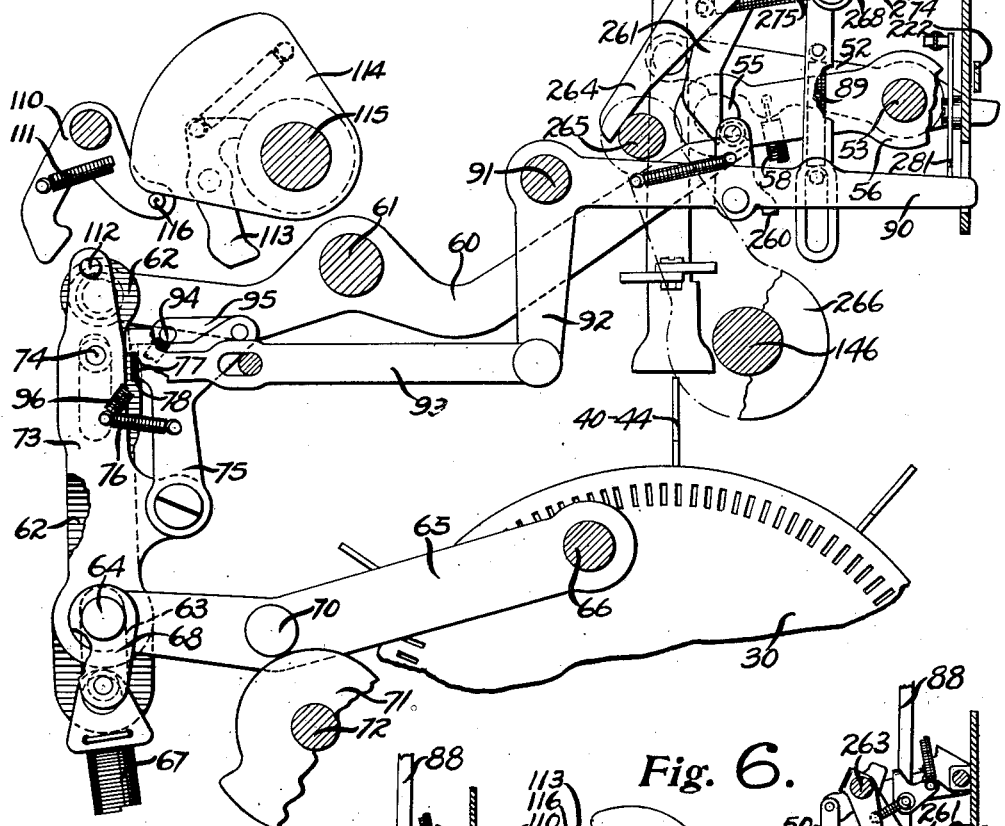
Fig. 4 is a detail right side sectional elevation of certain portions of the machine at the lower rear side, the view showing particularly the indexing means in the position it occupies before the motor bar has been depressed.

With the parts in the position of Fig. 4, the bail 55 tends to urge the lever 60 clockwise, which tends to pull the link 62 upward, but the latter cannot move upward because it is held by the latch 75 carried by the link 73 connected to the lever 65 that is held against upward movement by the relatively strong spring 67. Accordingly, in this position of the parts, which is the normal position, the bail 55 is held upward and the feeling or sensing members 46–50 remain elevated in inactive position.

The bail 55 is released, in the embodiment of the invention shown, as an incident to the conditioning of the machine for a cycle of operation by means of the motor bar 11.

Referring to Fig. 1, the motor bar 11 is connected to the pivoted levers 80 and 81 in the usual manner so that the lever 80 is rocked counterclockwise as viewed in Fig. 1 when the motor bar is depressed. Movement of this lever, acting through spring 82, tends to raise the long motor control link 83 that controls the clutch 84 and causes the motor to give the machine a cycle of operation. The rear end of lever 81 has a stud and slot connection with an arm 85 fixed to a shaft 86. The shaft 86 extends across the machine and, near the center of the machine, another arm 87 is fixed to it. The latter is pivotally connected to a downwardly extending link 88 whose lower end (Fig. 4) is connected through a spring 89 to one arm 90 of a bell crank lever pivoted at 91. The other arm 92 of this bell crank lever is connected to a link 93 provided with a bent end positioned in front of a stud 94 carried by a pass-by pawl 95 pivoted on the latch 75 and urged counterclockwise by a spring 96.

Figure 5:
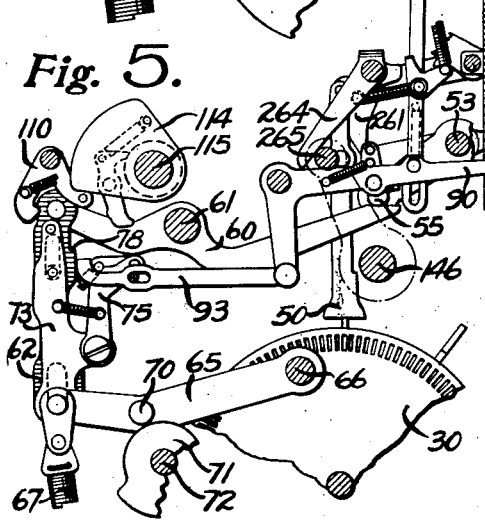
Fig. 5 is a view similar to Fig. 4 showing the parts in the position they occupy after the motor bar has been depressed, but before the machine has operated.

From this, it will be observed that, when the motor bar is depressed, the link 88 is raised which rocks the bell crank 90—92 counterclockwise as viewed in Fig. 4, and pulls the link 93 rearwardly to move the latch 75 out of engagement with the shoulder 78 on the link 62. When this occurs, the link 62 is free to move upward. This means that the lever 60 is free to rock clockwise and that the bail 55 can move downward under the urge of its spring. The net result is that, when the motor bar is depressed, the bail 55 moves downward and the feeling members 46–50 are moved by the power of their springs 58 to sensing positions. The position of the parts after the motor bar has been depressed, but before the cycle of machine operation has started, is shown in Fig. 5.

It is desirable to have the members 46–50 sense the indexing means immediately in order that the machine may be conditioned to perform the desired functions before the mechanism that accomplishes these functions is operated. Since the sensing members are released by depression of the motor bar, provision is made for preventing depression of the motor bar from causing a cycle of machine operation until the sensing members have moved to sensing position and conditioned the machine. Referring to Fig. 1, a latch lever 100 is pivoted adjacent the motor control link 83, the latch lever being urged counterclockwise as viewed in Fig. 1 by a spring 101, but being held in the position of Fig. 1 by a cam lever 102 that engages a stud 103 on the upper end of the latch lever. The lower end of the latch lever is positioned to engage a shoulder on the link 83 to prevent upward movement of said link, which would cause a cycle of machine operation, until the latch lever 100 is rocked counterclockwise from its Fig. 1 position. The cam lever 102 is fixed to a shaft 104 to which is also fixed an arm 105 connected to one end of a link 106 whose lower end is connected to a bell crank lever 107 urged counterclockwise as shown in Fig. 1, by a spring 108.

The rear arm of the bell crank lever 107 is positioned under the bail 55 that controls the sensing members 46–50, inclusive. When the bail 55 is moved downwardly, it rocks the bell crank 107 clockwise against the tension of spring 108 and moves the cam lever 102 to release the lever 100 for movement to released position under the urge of its spring. This releases the motor control link 83 and its spring 82 and then moves it upwardly to cause the machine to be given a cycle of operation. But, since this cannot happen until the bail 55 moves downward, which action releases the sensing members 46–50, the cycle of machine operation does not occur until the sensing members have moved to condition the machine.

The mechanism above described is returned to normal during a machine cycle as follows: Referring to Fig. 4, the shaft 72 is given a complete revolution during each machine cycle. This shaft corresponds to the shaft in Rinsche 1,580,- 534 to which the crank 48 of said patent is attached. It makes a complete revolution at about the rate of 200 strokes per minute whereas the machine, owing to the spring connection and the spring return operates at the rate of about 125 strokes per minute. During the forward stroke of the machine, a raised portion of cam 71 engages the stud 70 on lever 65 and rocks the lever to the position of Fig. 6. As it moves to this position, the link 73 is moved upwardly which moves the latch 75 upward and moves the stud 94 out of the control of the link 93. The latch 75 then moves counterclockwise under the urge of its spring and the lug on said latch moves over the shoulder 78 on the link 62. The movement of the lever 65 by cam 71 retensions the spring 67 and, when the stud 70 moves off of the high portion of the cam 71, the spring 67 tends to pull the link 73 downward. Since this link is now latched to the link 62, the latter tends to move downward which would rock the lever 60 counterclockwise as viewed in Fig. 6 and raise the bail 55 to raise the sensing members 46–50 to normal. But it is not desired to have the sensing members 46–50 moved upward so early in the cycle of machine operation, owing to the fact that they control certain other parts that will be presently described. Accordingly, a latch 110 is provided (Fig. 6) which is urged counterclockwise by a spring 111 so that when the link 73 is moved upward to its Fig. 6 position, the latch 110 automatically moves over a stud 112 on the link and latches the link in Fig. 6 position. The latch is released during the return stroke of the machine by a by-pass pawl 113 carried by a sector 114 on a shaft 115 that is first rocked clockwise from the position of Fig. 4 to that of Fig. 6 and then returned counterclockwise to normal. The shaft 115 is the shaft ordinarily known as the "800 shaft" in the Burroughs machine, the same being so numbered in the patent to Burroughs No. 504,963. During the counterclockwise movement, that is, during the return stroke of the machine, the pawl 113 engages a stud 116 on the latch 110 and moves the latter to release link 73 whereupon the links 73 and 62 are moved downwardly and the bail 55 is restored to normal to restore the sensing members 46–50 to normal and to tension the springs 58 to thus supply power for moving the sensing members during the next operation.

When the bail 55 is restored to normal, the bell crank 107 (Fig. 1) is released whereupon its spring 108 rocks it counterclockwise and restores the cam lever 102 to the position of Fig. 1 to thereby restore the latch lever 100 to active position.

In this manner, the function indexing means is sensed automatically prior to an operation of the machine; the machine is conditioned by power to perform predetermined functions depending upon the columnar position of the carriage and the arrangement of the indexing stops on the drum 30; the machine is operated; and, during the cycle of operation, the sensing means is restored to normal to free the indexing means to permit it to move easily when the carriage moves to the next column. Various functions may be controlled, but in order that the operation of automatic conditioning the machine may be clear, a number of illustrative functions will now be described.

Control of main register

Controls are shown for conditioning the main register, sometimes called the "crossfooter," for addition, subtraction, or "non-add."

Figure 2:
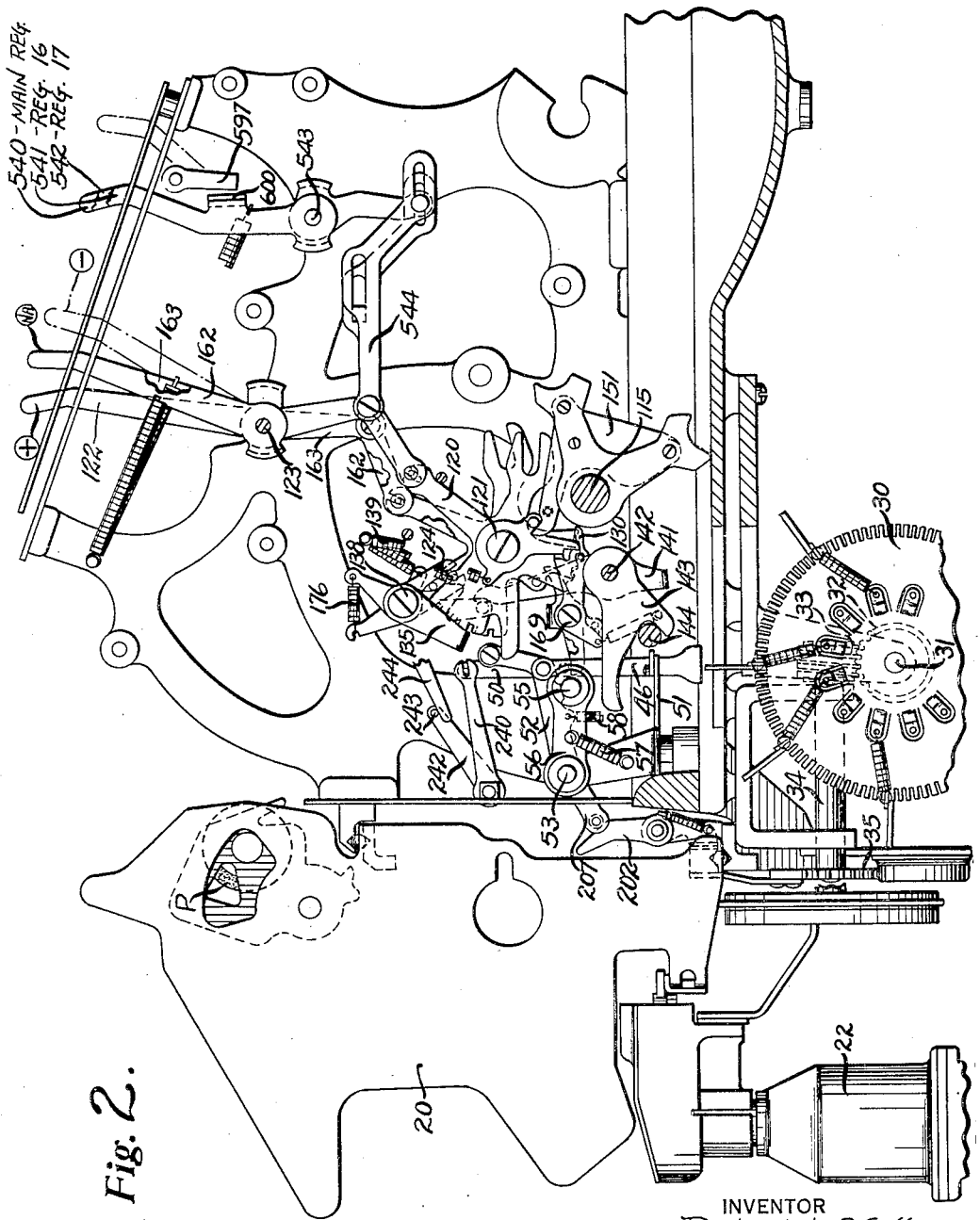
Fig. 2 is a left side elevation, some of the parts being cut away to show others more clearly, and the parts being shown in normal position.
Figure 7:
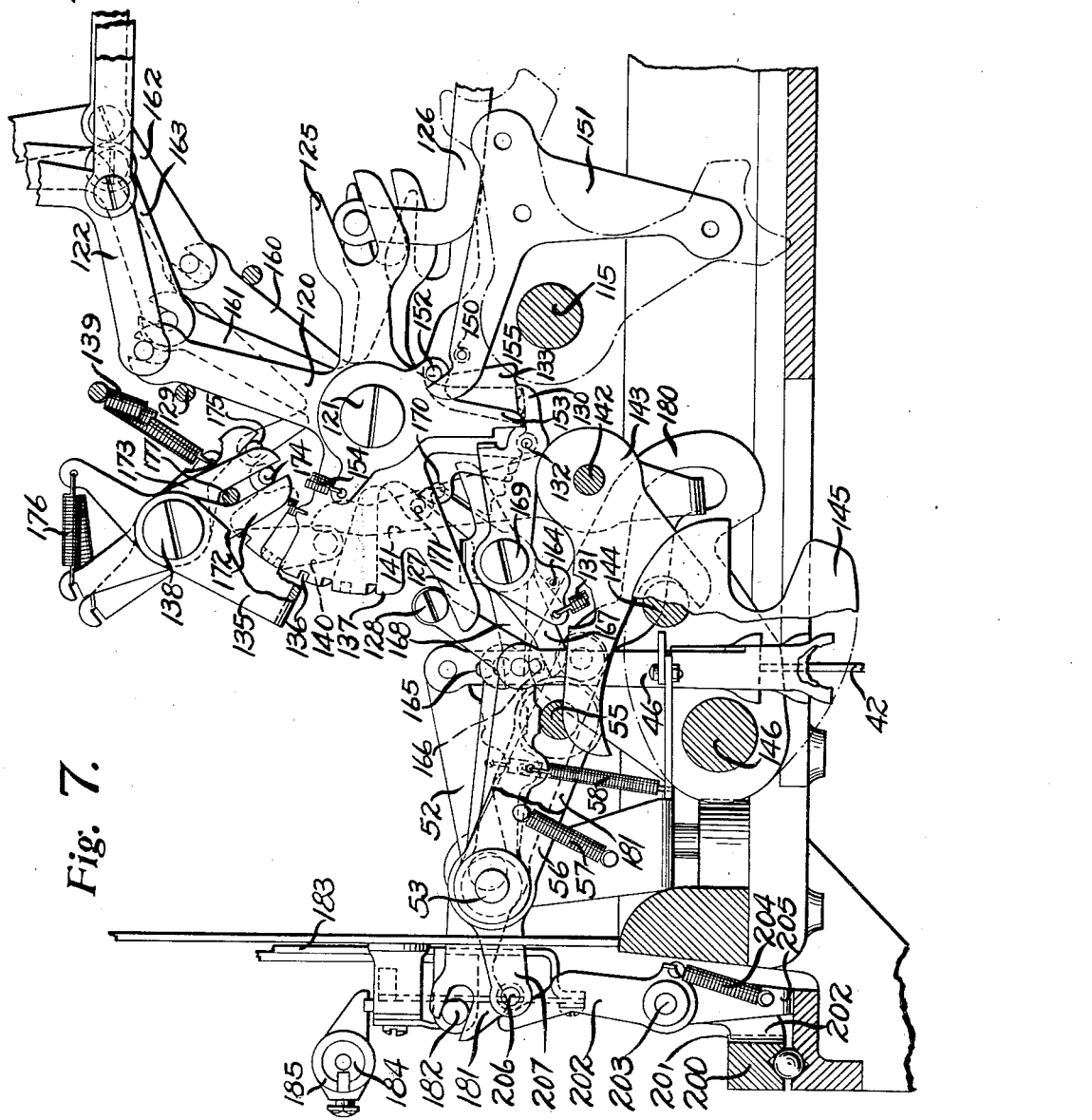
Fig. 7 is a left side elevation and section of certain of the controls, taken near the rear of the machine, the view showing the parts in the position they occupy after the motor bar has been depressed but before the machine has started to operate.

Referring to Figs. 2 and 7, a four-armed lever 120 is pivoted at 121. Its upper arm, to which the reference numeral 120 has been applied, is connected to the lower end of a manually controllable lever 122 pivoted at 123. This lever has three positions. Its central position is a "non-add" position; its rear position, shown in full lines in Fig. 2 is an "add" position; and its forward position, shown in dot-dash lines in Fig. 2, is a "subtract" position. The lever is urged counterclockwise as viewed in Fig. 2 by a spring 124 connected to four-armed lever 120, which springs thus tends to move the parts to "add" position.

The forward arm 125 of the four-armed lever 120 (Fig. 7) is connected to a suitable mechanism 126, hereinafter described, for controlling the main register 15 with respect to its add, non-add, and subtract operations.

The rear arm 127 of the four-armed lever 120 is positioned under a stud 128 carried by the sensing member 46 which extends upward and is bent slightly forward for the purpose. When the sensing member 46 is moved downwardly by the power of its spring 58, the four-armed lever 127—120 is rocked counterclockwise, as viewed in Fig. 7, to a position that depends upon the length of the indexing stop 40 that is in active position at the time. If a long indexing stop is in position, the four-armed lever will remain in add position. If an intermediate stop is in active position, the sensing member will move down slightly and the four-armed lever will be moved to "non-add" position. If a short stop 40 is in active position, the sensing member will move down a considerable distance to move the four-armed lever 127—120 to "subtract" position. The lever is also limited in its "subtract" position by a stud 129 that contacts the edge of lever 120 (Fig. 7).

The four-armed lever is releasably held in any of its three positions by a detent 130 urged counterclockwise by a spring 131 to hold a stud 132 on the detent in engagement with one of several notches in the bottom edge of the arm 133 of the four-armed lever 120.

After the four-armed lever 120 has been positioned, and during a cycle of machine operation, it is locked against movement until after the machine operation has been completed. This is accomplished by means of the latch 135 (Fig. 7) movable into engagement with notches 136 in a sector 137 forming a part of the rear arm 127 of the four-armed lever 120. The latch ball 135 is pivoted loosely on a shaft 138 and urged counter-clockwise as viewed in Fig. 7 by a spring 139 connected at one end with a projection from one arm of the latch bail. The latch has a downwardly extending arm 140 carrying a stud which is positioned to be engaged by an arm 141 fixed to a shaft 142. The shaft 142 has another arm 143 fixed to it, which is controlled by a shaft 144, the latter being carried by arms 145 fixed to a shaft 146 that is rocked during a cycle of operation of the machine. This shaft is the one ordinarily called the "100 shaft" in the Burroughs machine, the same being so numbered in the patent to Burroughs No. 504,963, and as shaft 47 in Rinsche 1,580,534. The arrangement is such that, during the first part of a machine cycle, the shaft 144 is rocked counterclockwise from the position of Fig. 7 and then returned clockwise during the latter part of the cycle. This results in rocking the arm 141 clockwise at the beginning of a machine cycle to permit the latch 135 to move into engagement with one of the notches 136 where it remains until near the end of a machine cycle, whereupon the arm 141 is rocked counterclockwise and the latch retracted from the notch.

Regardless of the position to which the four-armed lever 120 is moved, no matter whether manually or automatically, it is always returned to normal "add" position at the end of a machine operation.

During each machine operation, a stud 150 (Fig. 7) carried by an arm 151 that first rocks counterclockwise and then returns clockwise with shaft 115, engages the detent 130 and releases it. At the same time the arm 151 moves away from a stud 152 on a latch 153 pivoted on shaft 121 and urged clockwise by spring 154. As the detent 130 is moved to released position, the latch 153 snaps over a lug 155 on the detent and holds it in released position until near the end of the cycle of machine operation, that is, until after the locking latch 135 has been released, the sensing member 46 restored to normal, and the four-armed lever 120 thus released so that it, together with the manual lever 122, can be returned to "add" position by spring 124. After these events have occurred, the arm 151 engages the stud 152 and releases the latch 153 to permit the detent 130 to move to normal to hold the four-armed lever in "add" position.

To summarize the action of the controls for the main register, they are normally in "add" position, but may be manually conditioned for subtraction or non-adding by means of a lever 122. The controls are held momentarily in the position to which they are moved by a detent 130, and, then, during the cycle of machine operation, are locked against movement. Near the end of the cycle of operation, the lock is released and, before the detent 130 becomes operative, the controls are automatically returned to "add" condition.

The controls are automatically conditioned for subtraction or non-adding by the power-operated sensing member 46 that moves the four-armed lever 120 to the desired position where it is temporarily detained by the detent 130. Then, during the cycle of machine operation, the four-armed lever is locked in position and, near the end of the cycle, the sensing member is restored to normal, the lock released, and the controls returned to normal "add" condition.

Control of multiple registers

The registers 16 and 17 are controlled in much the same way as the main register.

A four-armed lever 160 (Fig. 7) is provided for the register 16 and a similar lever 161 controls register 17. Each can be positioned by manual levers 162 and 163 respectively which, however, are movable only to "add" and "non-add" positions, no provision being made for subtraction.

A separate detent, such as the detent 130 is provided for each of the four-armed levers 160 and 161 and these detents operate in the same way as detent 130 except that the detent 130 for the main register is provided with a stud 164 extending under the detents for the registers 16 and 17, so that when the machine is operated and the detent 130 is moved clockwise to its released position where it is latched, the two detents for registers 16 and 17 are likewise moved and held. The four-armed levers 160 and 161 are locked against movement by the locking latch 135 in the same manner as the four-armed lever 120 for the main register is locked.

The four-armed levers 160 and 161 are automatically controlled by the sensing members 47 and 48 respectively (Figs. 3 and 13) in the same manner as the main register. The construction is slightly different for the registers 16 and 17, in that the sensing members 47 and 48 carry studs 166 and 165 (Fig. 13) that engage over the rearwardly projecting ends of levers 167 and 168, respectively, pivoted on shaft 169. The other ends of these levers are positioned to engage studs 170 and 171 on the four-armed levers 161 and 160, respectively.

The controls for the registers 16 and 17 are urged to "non-add" position rather than add position because, while it is generally desired to add items in the main register during each cycle of operation of the machine, it is not usually desirable to employ the multiple registers except in certain operations.

The four-armed levers 160 and 161 for the registers 16 and 17 are urged to "non-add" position by means of scissors devices (Fig. 7) of which there is one for each lever. Each comprises two members 172 and 173 pivoted on shaft 138 and straddling studs 174 and 175, as the case may be, carried by the respective four-armed levers 161 and 160. The two scissors members 172 and 173 are urged into engagement with their studs by springs 176.

Normally, each pair of scissors arms straddles a fixed stud 177 on the frame of the machine. When one of the four-armed levers 160 or 161 moves to "add" position, it is rocked clockwise and the stud 175 or 174 moves its respective scissors member 173 counterclockwise against the tension of spring 176. During a machine operation when the detent for the four-armed member is released and, after the locking latch 135 has been released, the four-armed member is restored to its "non-add" position by the spring urge on the scissors arm 173. The arm 172 will, of course, restore the four-armed member to normal when said member is moved in the opposite direction as is necessary in totaling operations.

*Tabulating mechanism—Early release of carriage*

Provision is made for causing the carriage to tabulate from one column to the other at an earlier point in the cycle of machine operation than is ordinarily the case.

The tabulating mechanism is operated by a slotted cam 180 (Fig. 7) fixed to the main operating shaft 146 of the machine. This slotted cam rocks a lever 181 whose rear end extends through the back plate of the machine where it has a fork and stud connection 182 with a vertical slide 183. The arrangement is such that, during a cycle of machine operation, the slide 183 is first moved downwardly and then returned upward. This operates the line spacing mechanism (not shown in detail) to line space the platen during certain of the machine operations depending upon how the line spacing control is conditioned. The paper carriage supports a tabulating bar 184 (Fig. 3) carrying a plurality of tab stops 185, the bar being rockably mounted on the paper carriage and spring urged to normal (Fig. 8). In the different columnar positions of the carriage, the respective tab stops 185 abut against a block or abutment 190 which arrests the carriage in a columnar position corresponding to the stop, the carriage tending to move to the right in Fig. 8. As the machine is given a cycle of operation the tabulating bar carrying the tab-stop 185 is usually rocked to move the active tab stop above the abutment 190, whereupon the carriage moves to the next column, the arrangement being such that the succeeding tab stop 185 strikes the abutment 190 to arrest the carriage in the next column.

In the present case, instead of rocking the tabulating bar, the abutment is moved. Referring to Fig. 8, the slide 183 is provided with a pawl 192 having a shouldered end 193 engaging over a lug 194 on the abutment 190. The latter is pivoted at 195 and spring urged clockwise by a spring 196.

With this construction, as the machine starts to operate, the slide 183 moves downward and the pawl 192 rocks the abutment 190 to move it out of the path of the active tab stop. Accordingly, as far as the tabulating mechanism above described is concerned, the carriage is released for movement at the beginning of a cycle of machine operation. However, it is not desired to have the carriage move at this time and means is provided for temporarily locking it in position.

Referring to Fig. 7, the lower rail 200 of the paper carriage is slotted at 201 to receive the lower edge of a pawl 202 pivoted at 203 and urged clockwise by a spring 204 connected at one end to the stationary bracket 205. The pawl is normally prevented from moving by a stud 206 carried by a rearwardly extending portion 207 of one of the arms 56 that support the bail 55 heretofore described. As long as the bail 55 is in its upper normal position, the pawl 202 is held inactive by stud 206 as shown in Fig. 2. It will be recalled, however, that, when the motor bar is depressed, the bail 55 is released and it moves downwardly before the machine starts to operate. When it moves, the stud 206 moves upward and releases the pawl 202 which is thereupon moved by its spring 204 into engagement with the carriage, as shown in Fig. 7, to hold the latter against movement. The carriage is thus prevented from moving to the next column, even though the tabulating mechanism has released it as above described.

Figure 6:
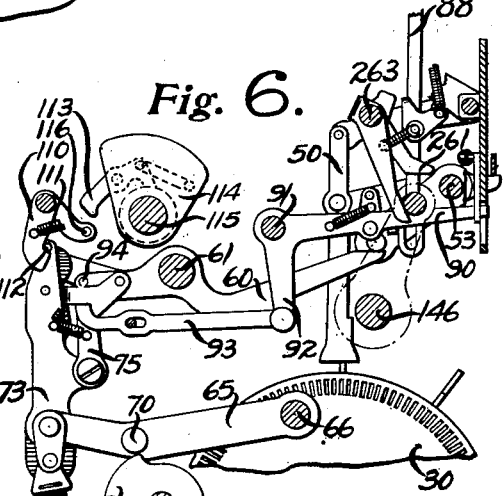
Fig. 6 is a view similar to Fig. 5, except that the parts are shown in the position they occupy at the extreme end of a forward stroke of machine operation and just after the printing mechanism has operated.

Referring to Figs. 4, 5 and 6, it will be recalled that the bail 55 remains in its lower position during the first half of a cycle of machine operation and that, during this part of the cycle, the link, or slide, 73 is moved upward and latched in the position of Fig. 6. Also, that during the early part of the return stroke of the machine, the slide 73 is released and the release of this slide causes the bail 55 to be restored to normal. The restoration of bail 55 to normal causes the stud 206 (Fig. 7) to cam the latch 202 out of engagement with the paper carriage and the latter is thereupon released to move to its next columnar position. This release occurs early in the return stroke of the machine to give the carriage enough time to move to its next column by the time the cycle of machine operation has been completed.

The printing mechanism operates near the end of the forward stroke of a machine and hence the carriage is not released for movement until after the printing mechanism has operated.

As the tabulating pawl 192 (Fig. 8) moves downwardly, during the forward stroke of the machine, a stud 210 on the pawl engages a cam 211 (Fig. 3) which is prevented from rocking clockwise as shown in Fig. 3 by a stud, there shown. This cam causes the pawl 192 to be pushed clockwise (Fig. 3) to move the shoulder 193 away from lug 194 to thereby release the abutment 190 which is thereupon freed to move back to normal under the urge of its spring 196. But the abutment does not return to normal until after the carriage starts to move to its next column because, when it was first released from the active tab stop 185, it moved to the left slightly (Fig. 8) so as to be under the active tab stop, which thus temporarily prevents its return. This lateral movement of the abutment is due to the fact that the abutment is carried by a stud 212 (Fig. 8) supported on a slide 213. This slide is connected to the lower end of a lever 214 (Fig. 3) pivoted at 215 and urged clockwise by a spring 216. The other end of lever 214 is connected to a dash pot 217. When a carriage tab stop strikes abutment 190, the latter moves to the right slightly (Fig. 8) and the dash pot cushions the action, the spring 216 being tensioned. When the abutment is pulled down by the slide 183, as above explained, the spring 216 moves the slide 213 to the left and moves the abutment under the active tab stop.

*Control of tabulating mechanism for skip tabulation*

In addition to controlling functions of the machine, such as above described, another function of the machine that may be automatically controlled is the tabulation of the carriage, that is, columnar printing.

The conditioning of the tabulating mechanism is controlled by the sensing member 49 (Figs. 3 and 13). The rear end of the arm 52 to which the sensing member 49 is connected extends under one arm of a bell crank 222 best shown in Fig. 3. This bell crank is connected to a link 223 which is slidable on a stud 224 and provided with a downwardly extending projection 225 adapted to engage a slide 226 which is similar to the slide 92 shown in Muller Patent No. 1,942,216. Referring to Fig. 8, the slide 226 is yieldingly connected by a spring 227 to another slide 228 having a cam end 229 adapted to engage a cam notch in the abutment 190. The arrangement is such that when slide 228 is moved to the right in Fig. 8, it cams the abutment 190 downward out of the path of the tab stops. When the slide 226 is moved to the right in Fig. 8, it is latched in this position by a latch 230 that engages over a stud 231 in slide 226. This latch may be released by an extra long tab stop 185—L (Fig. 8) which engages a pass-by pawl 232 on latch 230 and moves it to released position.

When the sensing member 49 is moved down it rocks bell crank 222 clockwise in Fig. 3 which moves link 223 and slide 226 to the right. This sets the skip-tab mechanism as explained.

*Automatic control of repeat machine operations*

Another function, or operation, of the machine that is automatically controlled is the number of cycles through which the machine will go without any attention on the part of the operator.

These repeat machine operations are controlled by the sensing member 50 (Fig. 4), which is connected at its upper end to an arm 240 fixed to a shaft 241 pivotally supported on the back plate of the machine. This shaft has another arm 242 fixed to it and extending upwardly as shown most clearly in Fig. 1. The arm 242 has a stud 243 on its upper end positioned over one end of the lever 244 fixed to a shaft 245. Another arm 246 is fixed to the shaft 245 and the upper end of arm 246 has a yielding connection through spring 247 with a slide 248, said spring 247 also serving to urge arm 246 counterclockwise. The slide 248 is urged to the left, as shown in Fig. 1, by spring 247. The spring 247 is connected to a lug projecting from the upper edge of the slide 248 and to an extension of lever 246 above the stud entering the slot in slide 248 so that the spring urges the lever 246 clockwise which urges the slide 248 forwardly. This slide controls the repeat operations of the machine in a manner which is described in detail in Patent No. 1,397,774 and which will be only briefly described here.

When the slide 248 is moved to the right as viewed in Fig. 1, it is positioned under a stud 250 on an arm 251 which is thereby prevented from rocking to its full extent in a clockwise direction. The limited movement of the arm 251 prevents a pass-by pawl 252 on its end from acting on a stud 253 on the end of a pivoted lever 254 which is normally rocked near the end of a cycle of operation of the machine to release depressed keys and engage a slide 255 to release the motor bar which has been latched by a latch 256. The normal release of these parts is described in detail in Muller Patent No. 1,397,774. When the pass-by pawl 252 is prevented from acting as just mentioned, the keys will not be released and the motor bar will remain depressed to cause the machine to take another cycle of operation.

In positions of the indexing means where the sensing member 50 is not allowed to move downward, the repeat slide 248 remains in the position of Fig. 1 and the machine is conditioned to be given only a single cycle of operation. If, however, in a predetermined column, the sensing member 50 is allowed to drop, the arms 240 and 242 (Fig. 1) are moved counterclockwise, which rocks arms 244 and 246 to move slide 248 to the right (Fig. 1) to condition the machine for repeat operations. Accordingly, in any desired columnar position of the carriage, repeat operations can be caused to take place automatically by having the proper abutment stop 44 positioned on the indexing means.

It will be recalled that the motor control link 83 is normally latched against movement by the lever latch 100 (Fig 1), and this latch is returned to normal at the end of each cycle of machine operation. Means must be provided to disable this latch for repeat operations. Referring to Fig. 4, it will be recalled that the latch 75 is controlled by the link 93 which, in turn, is moved by the bell crank 90—92. When the link 88 is moved upwardly from the position of Fig. 4, the bell crank 90—92 is moved to release latch 75 whereupon the bail 55 moves down and this releases certain parts that release the latch lever 100 which moves out of the path of link 83. When the bail 55 is restored to normal during the machine cycle, the latch 100 is restored to normal to block link 83.

Referring to Fig. 4, the bell crank lever 90—92 carries a pass-by pawl 260 adapted to be engaged by one arm 261 of a yoke 262 pivoted at 263. This yoke has another arm 264 engaging a shaft 265 carried by arms 266 fixed to one of the main drive shafts 146 of the machine. The shaft 146 is first rocked clockwise from the position of Fig. 4 and then returned counterclockwise during a cycle of machine operation. The yoke 262 is normally prevented from moving by means of a latch 268 having a lateral lug 269 engaging over a projection 270 on the yoke, the latch being urged counterclockwise as viewed in Fig. 4 by a spring 271. During a normal operation of the machine, as the shaft 146 rocks clockwise, the shaft 265 moves away from the arm 264, but the yoke 262 does not move because it is held by the latch 268. However, when the machine is conditioned for repeat operations, it will be recalled that the sensing member 50 is moved downwardly which rocks the shaft 241 counterclockwise. This shaft carries a projection 273 adapted to engage a stud 274 on the latch 268 in such a way that, when the sensing member 50 moves downwardly, the latch 268 is moved to a position to release yoke 262. Accordingly, during that cycle of machine operation, the yoke 262 will be rocked counterclockwise by its spring 275. During this movement, the arm 261 will pass the pass-by pawl 260 but, during the return movement of the yoke, caused by the return movement of shaft 265, the arm 261 will engage the pass-by pawl 260 and rock the bell crank 90—92 clockwise to enable it to move to a position to grasp latch 75 and release it as the bell crank 90—92 moves counterclockwise again. A pin and slot connection is provided between link 88 and bell crank 90—92 to permit release of latch 75 to permit bail 55 to move down a second time even though the link 88 is held upward by the latched down motor bar. Accordingly, near the end of the return stroke of the machine, the bail 55 is again released to enable it to move to release the sensing members and the latch 100 for the motor control link 83 is disabled so that the latter may move upward to cause a repeat operation of the machine.

It is not desired under any circumstances to cause a repeat operation of the machine until after the paper carriage has reached the column intended for such operation. An interlock has been provided to prevent this.

Referring to Fig. 3, the machine is provided, as previously explained, with a dash pot cushion 217 for the tabulating mechanism as described in detail in Muller Patent No. 1,942,216. When one of the tab stops 185 strikes the abutment 190, the latter is moved to the right as viewed in Fig. 3 against the cushioning action of the dash pot above mentioned. When the abutment is disengaged from the active tab stop, the spring 216 (Fig. 3) which is connected to lever 214 that, in turn, is connected to the link 213 (Fig. 8) which carries the abutment, moves the abutment to the left in Fig. 8.

The link 213 is provided with an extension 280 (Fig. 8) which engages the upper end of a pawl 281 pivoted at 282 and urged counterclockwise by a spring 283. The lower end of this pawl is adapted to move over the end of one arm of the bell crank 90—92 (Fig. 4) that controls the release of the latch 75 which controls the release of bail 55 that controls the release of the latch 100 for the motor control link 83.

When a tab stop is against the abutment 190, the pawl 281 is rocked clockwise out of alignment with the lever 90, but, when the abutment is released of the tab stop, the link 213 moves to the left and swings the pawl 281 counterclockwise. The pawl cannot move over the lever immediately because the lever is still in its upward position, but the pawl moves against the side of the lever ready for action. As soon as the lever 90 is moved downwardly, as it is during the latter part of the cycle of machine operation, the pawl 281 moves over the lever to prevent upward movement of it to release the latch 75 until the carriage reaches the column it is to occupy whereupon the tab stop engages the abutment 190 and the movement of the latter to the right (Fig. 8) swing the pawl 281 clockwise out of position, thereby releasing the lever 90 which immediately moves to release the latch 75, thereby releasing the motor control link to permit it to give the machine a second cycle of operation.

From the descriptions just given, it will, therefore, be apparent that the repeat machine operations can be controlled automatically in the same manner as other functions of the machine through its sensing member 50, suitable interlocks and controls being provided to insure that the operation will take place properly.

Special control of carriage

When the machine is conditioned for and operated to perform a certain sample of work, to be presently described, the paper carriage is caused to return automatically after a repeat operation of the machine.

Referring to Fig. 1, the machine is provided with a special motor bar 300. One arm of a bell crank 301 pivotally carried on the stem 297 of the special motor bar 300 has a slotted end engaging a stud 299 on the lever 80 with which the regular motor bar is connected. The other arm of the bell crank 301 cooperates with a fixed stud 302. When the main motor bar is depressed alone, the lower arm of the bell crank 301 is rocked to a position over the stud 302 and prevents subsequent depression of the special motor bar 300 while the regular motor bar remains depressed. When the special motor bar 300 is depressed, a hook 298 on the stem of said motor bar engaging over the stud 299 causes the regular motor bar also to be depressed and latched down by the latch 256. The lower arm of the bell crank simultaneously moves down behind the stud 302 and, in cooperation with said stud, holds the special motor bar 300 down while the regular motor bar 11 remains down. The stem of the special motor bar is connected to one arm of a bell crank 303 urged clockwise as viewed in Fig. 1 by a spring 304. The other arm of this bell crank is positioned over a stud 305 on one arm of a three-arm member 306 pivoted at 307 and urged clockwise by a spring 308. The upper arm of this three-arm member contacts a stud 309 on a plate 310 connected to the drive shaft 311 which is first rocked counterclockwise from the position of Fig. 1 during a machine cycle and then returned clockwise. The lower arm of the three-arm member 306 carries a stud 312 adapted to cooperate with a pass-by pawl 313 pivoted on one arm of a pivoted bell crank lever 314.

When the special bar 300 is depressed, the bell crank 303 is rocked counterclockwise which frees the stud 305 and allows the three-arm member 306 to move clockwise under the urge of its spring 308 as the stud 309 is rocked counterclockwise during the machine cycle. During this movement of the three-armed lever, the stud 312 passes the pawl 313. Upon the return or counterclockwise movement of the three-armed lever 306, caused by the engagement of the stud 309 with it, the stud 312 engages the pass-by pawl 313 and rocks the bell crank 314 clockwise.

The bell crank 314 is connected at its lower end to a link 315 which, in turn, is connected to an arm 316 fixed to a shaft 317. This shaft carries another arm 318 connected to one end of a lever 319 pivoted at 320. The rear end of this lever is connected to a link 321 which, when the bell crank 314 is moved clockwise as above explained, is pulled downwardly.

Figure 14:
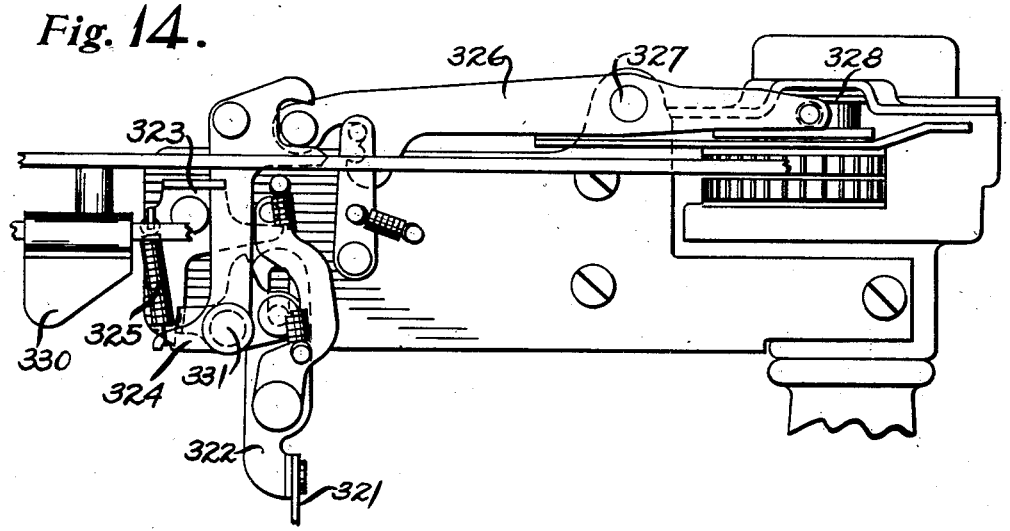
Fig. 14 is a view of the carriage return mechanism, the view being taken from the front.

Referring to Fig. 14, when the link 321 is pulled downward, it moves a slide 322 downward which releases a pivoted latch 323. Latch 323 releases a slide 324 which is thereupon moved upwardly by a spring 325 to rock a lever 326 clockwise about its pivot 327 to throw in the carriage return clutch 328. The carriage return mechanism is thus automatically conditioned during the return stroke of the machine to return the carriage toward its original position. This return movement continues until a cam 330 on the carriage engages a stud 331 on the slide 324 and moves it downwardly to rock the lever 326 counterclockwise to disengage the carriage return clutch.

Accordingly, if, at any time, the operator depresses the special motor bar 300, the paper carriage will be automatically returned toward normal and stopped in a predetermined column depending upon the location of the cam 330.

When the special motor bar 300 is depressed while the paper carriage is in a columnar position where it conditions the machine for an automatic repeat operation the above described parts are conditioned differently than above stated. It will be remembered that the carriage conditions the machine for an automatic repeat cycle by the rocking of the lever 246 (Fig. 1) clockwise. Connected to the lower end of this lever is a link 340 which, in turn, is connected to a pivoted latch 341 having a lateral lug on its end adapted to move under the upper arm of the three-armed lever 306.

Thus, if the special motor bar 300 is depressed while the carriage is in a columnar position where it conditions the machine for an automatic repeat operation following the cycle initiated while the carriage is in said position, the return mechanism is disabled and remains disabled as long as the machine remains in automatic repeat cycle condition. However, when the carriage comes to rest in the column where the last automatic repeat cycle is to be performed, that is, a columnar position immediately preceding one where a cycle must be initiated manually, the lever 246 and slide 248 return to normal and the carriage return mechanism will operate automatically at the end of said automatic repeat cycle of the machine.

Accordingly, even though the special motor bar 300 is depressed in the No. 1 column, the three-armed lever 306 cannot rock clockwise under the urge of its spring 308 and the carriage return mechanism is not conditioned for operation. In the No. 1 column, the machine is also conditioned to automatically skip to the No. 3 column and, since the repeat mechanism is conditioned for operation in No. 1 column, the carriage will move to its No. 3 column after the cycle in column No. 1, and the machine will then be automatically given a cycle of operation in column No. 3. In this column, the repeat mechanism is not conditioned for operation, and hence the above mentioned special control of the carriage return mechanism becomes operative so that, after the repeat operation in the No. 3 column, the carriage is automatically returned to the No. 2 column. In the latter column the repeat mechanism is not active but the skip-tab mechanism is. The machine is given a cycle in column No. 2 by depressing the regular motor bar and, after the cycle, the machine stops and the carriage tabulates to its No. 4 column, column No. 3 being skipped. An adjustment of a long stop 185L such that it will cause the carriage to be arrested in column 3 when it skips from column 1 to column 3 but not when it tabulates after an operation in column 2 is obtainable by virtue of the movement which the abutment 190 is permitted before it arrests the carriage after it has been engaged by a tab stop 185. Said long stop 185L can be so positioned that when the carriage is at rest in column 2 said long stop will be to the right of the latch pawl 232 as viewed in Fig. 2, but it will operate on the pawl 232 to trip the latch just too late to arrest the carriage in column 2 but quite early enough to arrest the carriage in column 3 when the carriage moves from column 1 with the skip-tab mechanism in skipping condition.

*Normalizing features*

It is possible to normalize both the tabulating mechanism and the repeat mechanism together, or to normalize the repeat mechanism separately.

Referring to Fig. 1, a normalizing key 350 is mounted on the keyboard, the key being latched in the usual manner after being depressed. The stem 351 of this key is slidably mounted on a stud 352 and the stem has a rear projection 353 carrying a stud 354 which, when the key is depressed, rocks a pivoted lever 355 (Fig. 3) clockwise. The center of this lever is connected to a link 356 which has a bent end 357 (Fig. 8) that disables the tabulating pawl 192. In other words, when the normalizing key 350 is depressed, the tabulating pawl 192 is disabled so that the tabulating mechanism will not be operated during a cycle of machine operation.

The stem 351 of the normalizing key also has a forward projection 360 adapted to engage a stud 361 on a lever 362 pivoted on the stud 352. The rear end of this lever carries a stud 363 adapted to engage the arm 244 connected to the shaft 245 that controls the repeat lever or arm 246. When the normalizing key 350 is depressed, the lever 362 is rocked counterclockwise, which rocks the repeat lever 246 counterclockwise, or prevents clockwise movement of it, so that repeat machine operations are prevented.

When it is desired to normalize the repeat mechanism only, another normalizing key 370 is depressed, this key being also latched after being depressed. The lower end of the stem of this key is connected to an arm 371 pivoted on the shaft 245. This arm has a lug 372 adapted to be positioned to the rear of a stud 373 on the repeat slide 248. Accordingly, when the normalizing key 370 is depressed, the repeat slide 248 cannot move to the right in Fig. 1, and the machine cannot be conditioned for repeat machine operations. The normalizing key 370 has no connection with the tabulating mechanism and hence its depression normalizes the repeat mechanism only.

*Details of main register control*

The automatic means for conditioning the machine for addition, subtraction or non-add in the main register have already been described.

Figure 9:
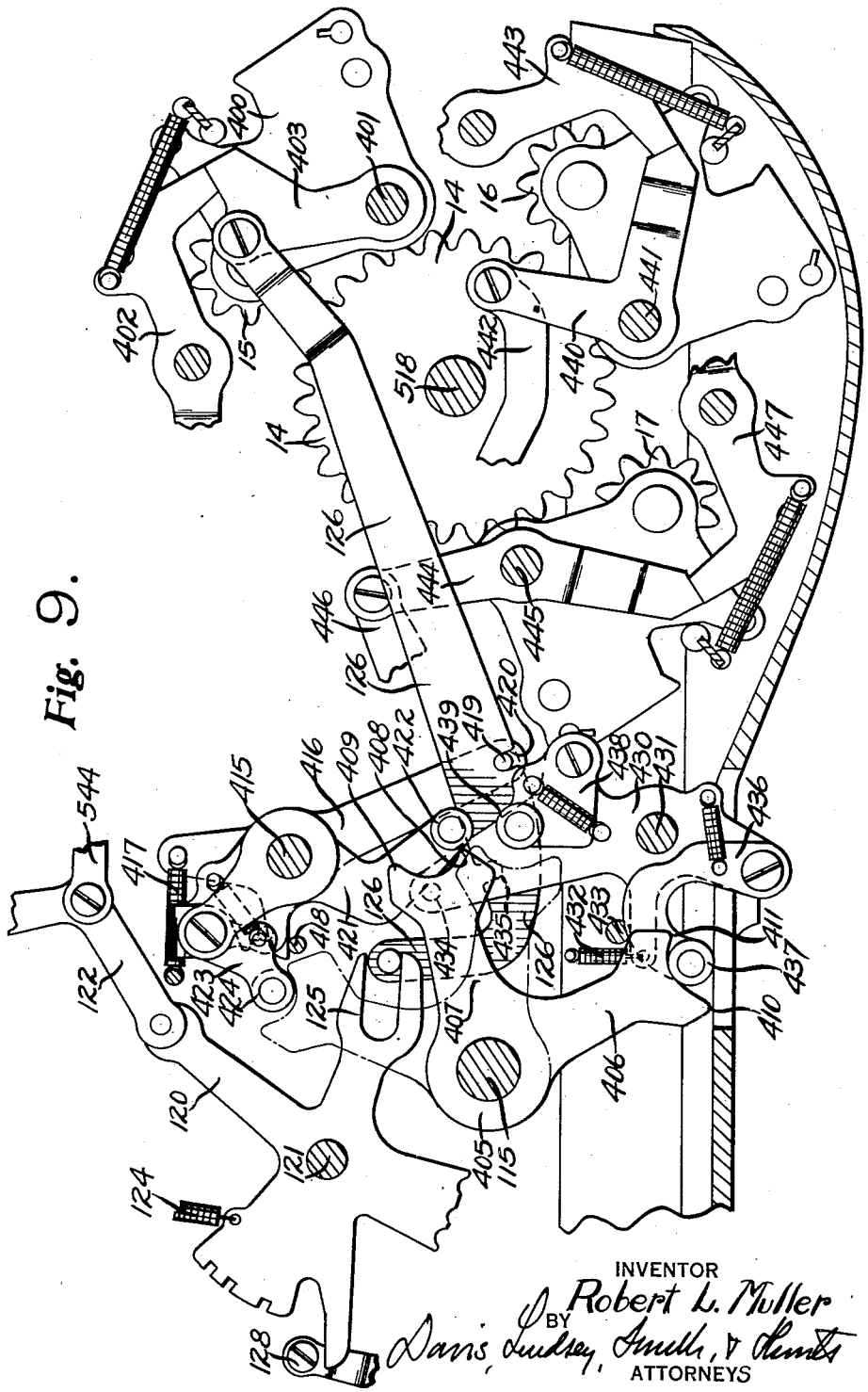
Fig. 9 is a partial side elevation and section showing some of the mechanism for controlling the registers.

The particular parts that are controlled to cause these functions to be performed are as follows:

Referring to Fig. 9, the main register 15 is carried by a rocking frame 400 fixed to the shaft 401. This frame may be rocked to engage and disengage the register with the actuators 14 by the link or pitman 126 connected to a crank 403 fixed to the shaft 401. The register 15 is shown in its disengaged position in Fig. 9 where it is held by a spring-urged detent 402 that cooperates with a cam point on the crank 403. This detent serves to releasably hold the crank 403 in either of its two positions.

The pitman 126 is moved back and forth by a cam 405 fixed to the shaft 115 that is rocked during each cycle of machine operation, said shaft corresponding to the shaft ordinarily known as 800 shaft on the Burroughs machine. This cam has two arms 406 and 407 and each arm is provided with two cam points, the arm 407 having the points 408 and 409 and the arm 406 having the points 410 and 411.

Fixed to a shaft 415 is a lever 416 urged counterclockwise (Fig. 9) by a spring 417 against a limit stud 418. This lever has a stud 419 on its lower end adapted to engage in a slot 420 in the pitman 126. When the pitman is in addition position, which is the position illustrated in Fig. 9, the stud 419 is in the slot 420.

Also fixed to the shaft 415 is an irregular shaped lever 421 having a roller stud 422 on its lower end and a passby pawl 423 on its upper end, the latter carrying a roller stud 424. The two roller studs 422 and 424 are positioned for operation by the cam points 408 and 409 of the cam arm 407 of cam 405.

As already explained, the four-armed lever 120 is normally urged to the add position of Fig. 9 by a spring 124; and in this position the pitman 126 is held in its lower position with the stud 419 in the slot 420. With the parts in the position of Fig. 9, assume that the machine is given a cycle of operation. As the cycle starts, the cam 405 is moved counterclockwise from the full line position of Fig. 9 to the dot-dash position. The cam point 408 on the end of arm 407 passes away from stud 422 without affecting it. Near the end of the forward stroke, the cam point 409 passes the pawl 423 without affecting the position of the lever 421. At the very beginning of the return stroke, the cam point 409 engages the roller stud 424 and rocks the lever 421 clockwise. This rocks shaft 415 together with lever 416 clockwise and moves link 126 to the left in Fig. 9, thereby rocking the register 15 into engagement with the actuators. The register remains in engagement until the end of the return stroke when the cam point 408 engages the roller stud 422 on lever 421 and rocks said lever counterclockwise, thus moving the lever 416 in the same direction and pushing the link to the right to rock the register out of engagement with the actuators. The cam end 408, in the normal position of cam 405, contacts the roller 422 and holds the lever 421 in position of Fig. 9 so as to maintain the register in disengaged position, although it is also releasably maintained in this position by the detent 402.

Subtraction is performed by changing the timing of the engagement between the register and the actuators. For this purpose, a lever 430 is provided, which is pivoted on the shaft 431 and urged clockwise by a spring 432 into engagement with a limit stud 433. The upper end of this lever carries a stud 434 adapted to engage in a slot 435 in the pitman 126 when said pitman is raised to subtract position by the four armed lever 120. The lever 430 carries two passby pawls, a lower pawl 436 having a roller stud 437 and an upper pawl 438 having a roller stud 439.

Assume that the link 126 has been swung upward to subtract position so that its slot 420 is disengaged from the stud 419 and its slot 435 is engaged over the stud 434. Then, assume that the machine is given a cycle of operation. As the cam 405 moves counterclockwise the point 410 of the cam arm 406 engages roller stud 437 and rocks the lever 430 counterclockwise. This pulls the link 126 to the left to engage the register with the actuators at the beginning of the forward stroke of the machine. The parts remain in this condition during the forward stroke. Near the end of the forward stroke the cam point 411 of the arm 406 passes the roller 439 of the passby pawl 438 without affecting the position of lever 430. But, at the beginning of the return stroke, the point 411 engages the roller stud 439 and rocks the lever 430 clockwise to push the pitman 126 to the right to disengage the register from the actuators. It will thus be seen that, in subtraction, the register is engaged with the racks at the beginning of the forward stroke and the pinions are rotated in a direction opposite to that in which they are rotated for addition. This method of performing subtraction is well known and the theory of it need not be explained.

When the four armed lever 120 is moved to non-add position, that is, to a central position as related to its add and subtract positions, the pitman 126 is swung to a position such that it is disengaged from both the stud 419 and the stud 434. When the machine is given a cycle of operation the cam 405 actuates the levers 421 and 430 as heretofore described but, since these levers are not connected to the pitman 126, they have no effect upon the position of the register.

It has not been considered necessary to illustrate the controls for the multiple registers 16 and 17 because they are controlled in the same way as the main register and by like mechanisms except that a few of the parts are shaped slightly differently to accommodate themselves to the different location of the registers.

For example, the multiple register 16 is carried by a rocking frame 440 pivoted on shaft 441, said frame being rocked by a pitman 442 and releasably held in either of its two positions by a spring detent 443. The multiple register 17 is carried by a rocking frame 444 pivoted on shaft 445 and rocked by a pitman 446. A spring detent 447 holds this register in either of its two positions. The two pitmans 442 and 446 are controlled by mechanism like that described for pitman 126.

*Tens-transfer mechanism*

The main register is provided with a tens-transfer mechanism capable of operation during both addition and subtraction. There is also a tens-transfer mechanism for each set of multiple registers, but since it is the same as that for the main register except that it does not operate for subtraction, the description will be confined to tens-transfer mechanism for the main register.

Figure 10:
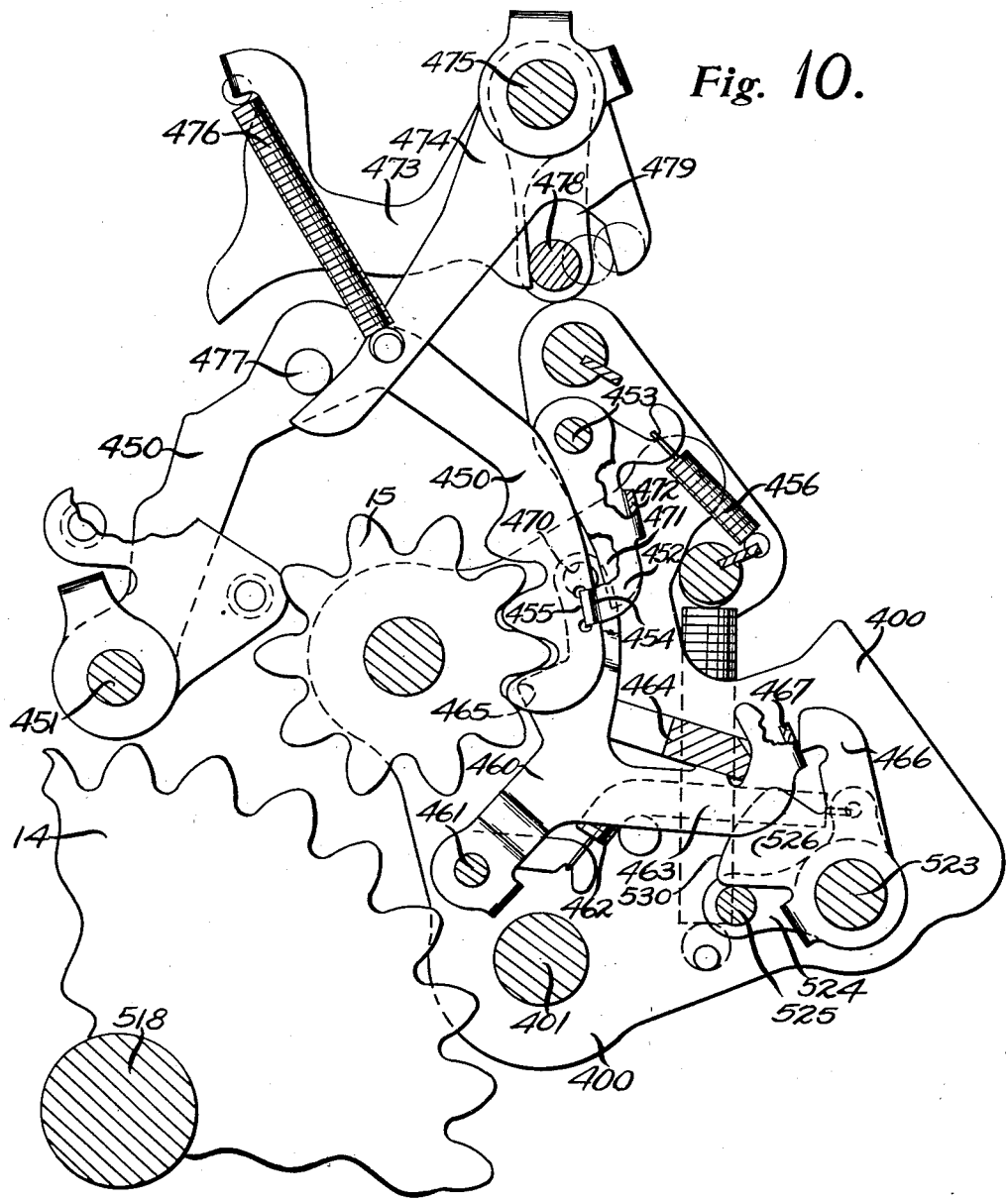
Fig. 10 is an enlarged detail of the tens-transfer mechanism the parts being in normal "add" position.

Referring to Fig. 10, each register pinion 15 is provided with a toothed tens-transfer segment 450 pivoted on the shaft 451. These segments are urged in a direction to either "carry" or "borrow" by mechanism that will be presently described. The tens-transfer segments are normally latched in the position of Fig. 10 by latches 452 pivoted on a shaft 453. The latches have lugs 454 engaging in notches 455 in their respective segments. Each latch 452 is formed as one arm of a yoke having a second arm 471, to be mentioned later, the arms 452 and 471 being united by a cross member 472. Said yokes are urged clockwise as viewed in Fig. 10 by springs 456 connected to projections on the arms 471. The shaft 451 to which the tens-transfer segments 450 are pivoted and the shaft 453 to which the latches are pivoted are carried by stationary frame plates of the machine.

A transfer pawl 460 is provided for each pinion, said pawls being pivoted loosely on a shaft 461 and urged counterclockwise as viewed in Fig. 10 by their respective springs 462, the pawls having forward extending arms 463 limiting against a bar 464 on the register frame. Each pawl is provided with a nose 465, arranged to be engaged by a wide tooth on its respective register pinion, said noses being shaped so that the pawls will be operated by their pinions when the latter are rotated through the interval between their "9" and "0" positions in either addition of subtraction direction. The shaft 461 carrying the pawls 460 is carried by the register frame so that these pawls move with the register as the latter is moved into and out of engagement with the actuators.

When one of the pinions passes through the interval between its "9" and its "0" positions, the wide tooth engages the nose 465 on the respective pawl 460 and rocks said pawl clockwise as viewed in Fig. 10 to an "initial transfer" position where it is latched by a latch 466 having a hooked end engaging over a lug 467 on the extension 463 of the transfer pawl 460.

Each pawl has an upward extension carrying a stud 470 adapted to engage the arm 471 of the latch yoke for the tens-transfer segment for the pinion of next higher order. The arrangement is such that, if one of the pawls 460 is set in its "initial transfer" position while the register is engaged with the actuators, then, as the register is moved out of engagement with the actuators and into engagement with the transfer segments, the stud 470 on the pawl will engage the arm 471 for the next higher order and rock the corresponding latch 452 so as to release the transfer segment to enable the same to move to effect a tens-transfer.

The tens-transfer segments 450 are urged in either add or subtract direction by means of scissors devices comprising, for each segment, a pair of arms 473 and 474 loosely pivoted on a shaft 475 and urged toward one another by a spring 476. The free ends of these arms are on opposite sides of a stud 477 on their respective transfer segments 450. The position of the arms is controlled by a bail 478 extending between projections on all the arms 473 and 474 and carried by arms 479 fixed to shaft 475. When this bail is in the position of Fig. 10, it engages the arm 473 and holds it in the position shown to put a tension on spring 476 tending to urge the arm 474 clockwise. This urges the tens transfer segments 450 in add direction, that is, in a direction to cause a "carry" as distinguished from a "borrow." When the bail 478 is swung to the right hand dot-dash position of Fig. 10, it engages an extension on the arm 474 and swings it counterclockwise so as to put a tension on spring 476 urging the arm 473 counterclockwise against stud 477, thus tending to move the tens-transfer segments 450 downward in a subtract or "borrow" direction. The bail 478 is positioned in response to the addition or subtraction condition of the machine by a mechanism best shown in Fig. 11.

Figure 11:
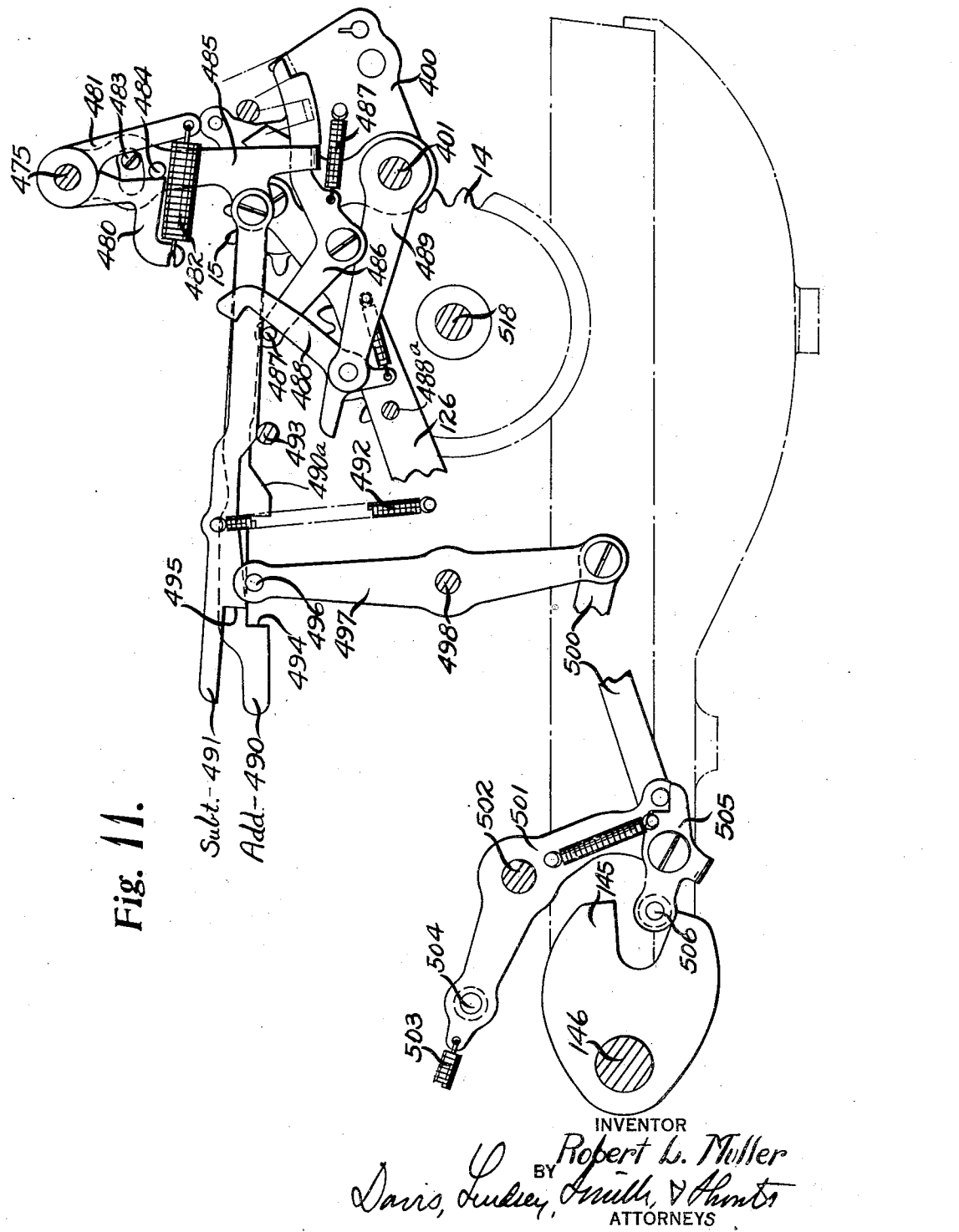
Fig. 11 is a partial left side elevation and section showing the mechanism for changing the condition of the tens-transfer mechanism.

Pivoted on the shaft 475 is another scissors device comprising arms 480 and 481 whose free ends are joined by the spring 482. These arms limit against a stationary stud 483 and also cooperate with a stud 484 on an arm 485 fixed to the shaft 475. The arm 485 may occupy either a central or normal position shown in dot-dash lines, an "add" position shown in full lines, or a "subtract" position shown in dot-dash lines at the right of Fig. 11. This arm may be latched in either its "add" or "subtract" positions by a bell crank latch 486 urged clockwise by a spring 487. This latch has appropriate shoulders for the purpose adapted to engage over a lug on arm 485 as shown in Fig. 11. The left hand end of latch 486 carries a stud 487 adapted to be engaged by a shoulder on a pawl 488 pivoted on the end of an arm 489 fixed to the shaft 401 that carries the register frame, said pawl 488 being urged counterclockwise as viewed in Fig. 11 by a spring. When the register 15 is rocked into engagement with the actuators, the shaft 401 is rocked counterclockwise (Fig. 11) which moves the arm 489 in the same direction, whereupon the pawl 488 rocks the latch 486 counterclockwise to release the arm 485. The arm 485 is then free to move under the influence of the scissors device 480—481 in the direction in which it is urged. Thus, every time the register is rocked into engagement with the actuators, the latch 486 is released, the arm 485 is released, and this arm, together with the bail 478 (Fig. 10), is moved to control the tension on the tens-transfer segments.

The arm 485 is also controlled by two links 490 and 491, said links comprising respectively an add and a subtract link, and having their right hand ends (Fig. 11) pivoted to arm 485. The free ends of these links are urged downwardly by springs 492 against a limit stud 493 whose purpose will be presently described. The add link 490 is provided with a shoulder 494 and the subtract link with a shoulder 495, the two shoulders being oppositely positioned and adapted for engagement with a stud 496 on the end of a lever 497 pivoted at 498. The lower end of this lever is connected by a link 500 to another lever 501 pivoted at 502 and urged to its central position by a toggle spring 503. The lever 501 has a roller stud 504 on its upper end and a passby pawl 505 on its lower end carrying a roller 506. These two roller studs 504 and 506 are positioned so as to be engaged by a cam 145 on the shaft 146 that is rocked during each cycle of machine operation. When the machine is given a cycle, the cam 145 is first rocked counterclockwise and then returned clockwise. During the forward stroke, the cam 145 passes pawl 505 and, near the end of said stroke, said cam engages the roller stud 504 to rock the lever 501 clockwise. Assume that, at the beginning of the cycle, the arm 485 is in the "add" position of Fig. 11 and the links 490 and 491 are in the position shown in which the "add" link 490 is in its lower or active position while the subtract link is inactive. These two links are so positioned by reason of the shape of their lower edges which engage stud 493. Also, assume that addition is being performed. As stated, near the end of the forward stroke, the cam 145 engages roller 504 and rocks lever 501 clockwise which, through link 500, rocks lever 497 in the same direction. The notch in link 490 is of such length that, when lever 497 is rocked under the conditions just explained, the stud 496 does not move link 490. Accordingly, the parts remain in the position shown in Fig. 10 during the forward stroke of the machine. During this portion of the stroke the register is not in engagement with the actuators but is in engagement with the tens-transfer segments.

At the beginning of the return stroke, the register is rocked into engagement with the actuators. As the register is rocked toward the actuators, the arm 489 (Fig. 11) is rocked counterclockwise, which causes the shoulder on pawl 488 to engage the stud 487, thereby rocking the latch 486 counterclockwise. This frees arm 485 for movement to its central or normal position under the urge of its spring 482. As the arm 489 completes its counterclockwise movement, a rearward projection on the pawl 486 engages a stud 488ª on the side frame of the machine, thereby causing the pawl 488 to be rocked clockwise, which releases latch 486 for movement back to latching position, the arm 485 having in the meantime moved to its central position. The latch 486 contacts the lug on the lower end of arm 485 but does not latch said arm because there is no shoulder on the latch 486 for engaging arm 485 when the shoulder is in its central position. The effect of this movement of arm 485 is to move the links 490 and 491 so that both links are active and responsive to future movements of stud 496. Also the tens-transfer segments scissors device 473—474 (Fig. 10) is moved to a neutral position which moves the tens-transfer segments while the register pinions are out of engagement therewith to normal position where they are latched by latches 452.

During the return stroke of the machine the register is in engagement with the actuators and the tens-transfer segments are not active to effect tens-transfers. The transfer pawls 460 are, however, being set in "initial transfer" positions. Near the end of the return stroke, the cam 145 (Fig. 11) rocks the lever 501 counterclockwise thus moving lever 497 in the same direction and pulling the "add" link 490 to the left to pull the arm 485 to "add" position. This rocks shaft 475 clockwise in Figs. 11 and 10, which puts a tension on the tens-transfer segments 450 tending to cause a "carry". The latch 486 being free snaps to position under the urge of its spring 487 to hold arm 485 in add position. The timing of the parts is such that the tension is put on the tens-transfer segment before the register is rocked out of engagement with the actuators and into engagement with the transfer segments. The movement of the register into engagement with the transfer segments trips the latches 452 for all orders where the pawls 460 have been set and causes the necessary "carrys" to take place.

In the movement of the arm 485 and links 490 and 491 leftward to the position of Fig. 11, the subtract link 491 is cammed clockwise by the stud 493 to the position of Fig. 11 so that, when the lever 497 returns to its normal mid-position of Fig. 11 at the close of the return stroke of the cycle, the shoulder 495 is not engaged by the stud 496.

When subtraction is performed the register is rocked into engagement with the actuators at the beginning of the forward stroke of the machine. The pawl 488 is thus moved immediately and it pulls the latch 486 to released position and permits arm 485 to move to its central or normal position at once. This positions both links 490 and 491 in active relation to stud 496 and restores the scissors device for the tens-transfer segments to normal which causes said segments to move to normal where they are latched. The register pinions are in engagement with the actuators and not with the tens-transfer segments and the latter are not used during the forward stroke. Near the end of the forward stroke the cam 145 (Fig. 11) engages roller 504 and rocks lever 501 clockwise. This rocks the lever 497 in the same direction. The stud 496 then engages the shoulder 495 and moves link 491 to the right to move the arm 485 to the "subtract" position shown in dot-dash lines in Fig. 11. This rocks shaft 475 counterclockwise and moves the scissors device 473—474 (Fig. 10) to place a tension on the tens-transfer segments tending to cause a "borrow". The timing is such that this tension is put on the tens-transfer segments before the register engages said segments as it moves out of engagement with the actuators at the beginning of the return stroke. This movement of the register trips the latches 452 for all orders where a pawl 460 has been set and causes the necessary "borrows" to take place.

In the movement of the arm 485 and links 490 and 491 from their normal mid-position to their subtraction position, the add link 490 is cammed clockwise by the stud 493 so that, when the lever 497 returns counterclockwise to its normal mid-position at the beginning of the return stroke of the cycle, the shoulder 494 is not engaged by the stud 496.

Near the end of the return stroke, the cam 145 engages roller 506 and rocks lever 501 counterclockwise. This moves lever 497 in the same direction. This movement of lever 497 and stud 496 does not affect the links 490 and 491.

Figure 12:
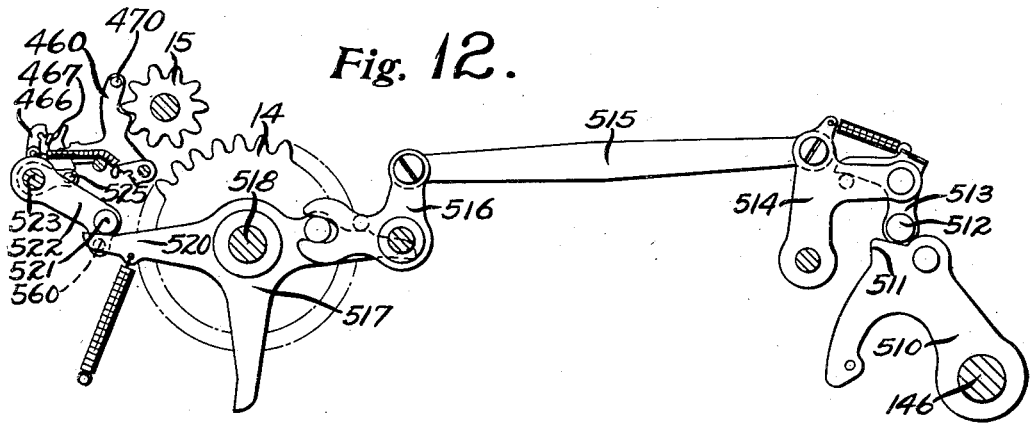
Fig. 12 is a partial right side elevation and section showing the restoring means for the tens-transfer mechanism.

A restoring mechanism for the tens-transfer is provided, which is best shown in Fig. 12. Fixed to the shaft 146 that is oscillated during each machine cycle is an arm 510 having a cam nose 511 adapted to engage a roller stud 512 on a passby pawl 513 carried by a bell crank 514. This bell crank is connected by a link 515 to a second bell crank 516 having a stud and slot connection with a three-armed lever 517 pivoted on the shaft 518. The left hand arm 520 of the three-armed lever 517 is positioned under a stud 521 upon an arm 522 fixed to the shaft 523 on which the latches 466 are loosely pivoted (Fig. 10). The arrangement is such that, at the very beginning of the forward stroke of the machine, the cam nose 511, operating on roller 512, moves the parts just described so as to rock the shaft 523 clockwise as viewed in Fig. 10. Fixed to the shaft 523 are two arms 524 carrying a bail 525 positioned under extensions 526 on the latches 466. When the shaft 523 is rocked clockwise, the latches 466 are moved to released position which permits the pawls 460 to be moved to normal by their springs 462. The other two arms of the three-armed lever 517 (Fig. 12), to one of which the bell crank 516 is connected, are for restoring the latches of the tens-transfer mechanisms of the multiple registers.

The transfer segments are restored to normal every time the arm 485 (Fig. 11) is moved to its central position, which occurs every time the latch 486 is released, and the latch 486 is released when the register is moved into engagement with the actuators.

From this it will be seen that, whenever the register is moved out of engagement with the tens-transfer segments, said segments are restored to normal. This does not always occur at the same point in the machine cycle. In addition it occurs near the beginning of the return stroke and, in subtraction, it occurs at the beginning of the forward stroke. The time at which the register moves into engagement with the actuators not only determines when the transfer segments are returned to normal but it also determines whether the tens-transfer mechanism shall be conditioned to carry or to borrow, because the question of the position to which the arm 485 and bail 478 shall be moved depends upon when the links 490 and 491 are placed in active position, and the time of this event depends upon the movement of the register into engagement with the actuators.

Total taking

In total taking, the register is engaged with the actuators and the latter are then moved to differential positions under the control of the register pinions. This requires that the pinions be arrested in their "0" positions and, for this purpose, the tens-transfer pawls 460 are locked. These pawls are locked by the extensions 526 (Fig. 10) on the latches 466, said extensions having cam edges 530. During total taking, the bail 525 is raised, the movement being enough to cause the cam edges 530 to move under the edges of the lugs 467 on pawls 460 so as to lock said pawls against movement. The bail is latched in this position, as will be presently explained, and the pawls are thus held in position to act as stops to arrest the pinions in "0" position.

Total taking is manually controlled in the machine disclosed, but it is explained in order to show how the registers are cleared.

Referring to Fig. 2, a total taking lever 540 is provided for the main register 15. Similar levers 541 and 542 are provided for the sets of multiple registers 16 and 17. These levers are pivoted at 543 and each is connected through a link, such as link 544 for lever 541, and respective lever 122, 162 or 163 to its respective four-armed lever 120, 160, 161. It will be observed that the links 544 are connected to their respective levers by a stud and slot connection so that said links may move with levers 122, 162 and 163 without interference from levers 540, 541 and 542.

Figure 16:
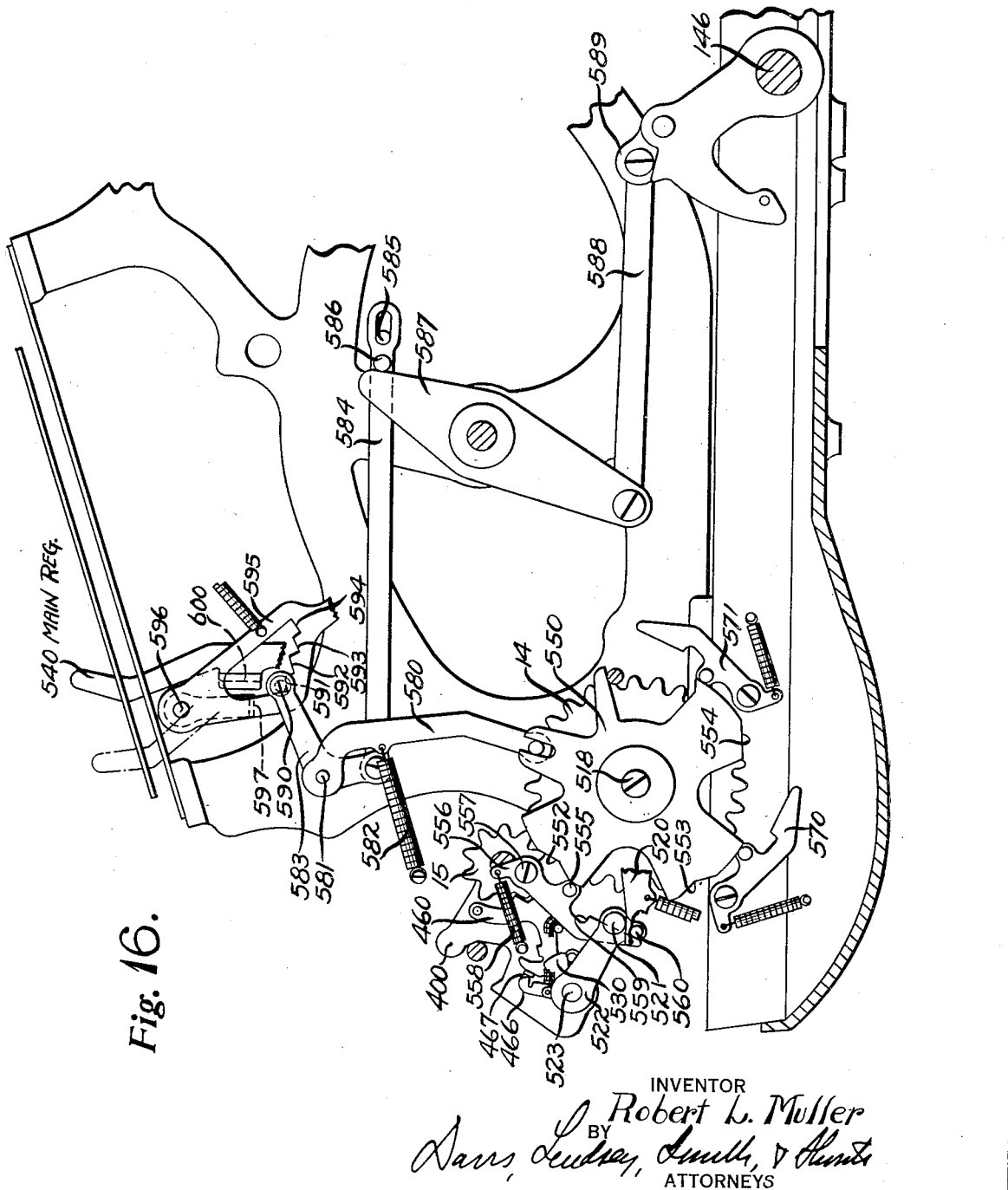
Fig. 16 is a partial side elevation and section of the right-hand side of the machine showing some of the total taking mechanism.

However, when one of the total levers 540, 541 or 542 is pulled forward to its total-taking position, shown in dot-dash lines in Fig. 2, its link 544 is pushed to the left which swings the corresponding four-armed lever 120, 160, 161 to the subtract position and moves the corresponding pitman 126, 442 or 444 to subtract position. This times the engagement of the corresponding register so that it will engage the actuators before they are moved during the forward stroke. The actuators then move to differential positions under the control of the register, but the register pinions must be arrested in "0" position, which is accomplished as follows:

As shown in Fig. 16, a cam disk 550 is journaled on the shaft 518. This disk has three cam arms having cam edges 552, 553 and 554 for controlling the pinions of the respective registers 15, 16 and 17. Since the control for each is alike, the description and illustration will be confined to one.

The cam edge 552 is positioned to act against a stud 555 on a latch 556 pivoted at 557 to a stationary frame. This latch is urged counterclockwise in Fig. 16 by a spring 558, and it has a shoulder 559 adapted to engage over a stud 560 on the arm 522 (Fig. 16) fixed to shaft 523. (See Fig. 12.) The arm 522 carries the stud 521 that is engaged by lever 517 (Fig. 12) when the latter is rocked at the beginning of a machine cycle.

At the beginning of the forward stroke of the machine the arm 522 (Fig. 16) with its stud 560 is rocked counterclockwise. Assuming that the notch in cam edge 552 is opposite stud 555 at the time, the latch 556 will snap over stud 560 and hold the arm 522 in its counterclockwise position. This holds the cam edges 530 (Figs. 10 and 16) under the lugs 467 on pawls 460 and locks the latter against movement to thereby cause them to act as stops to arrest the register pinions in "0" position. This condition remains until the end of the return stroke, at which time the lever 587 (Fig. 16) engages stud 586 and restores cam 550 to its normal position, whereupon the stud 555 on latch 556 rides on the inclined part of cam edge 552 to cause the latch 556 to release arm 522. The arm then moves back to normal and releases the tens-transfer pawls.

Similar latches 570 and 571 controlled by the cam edges 553 and 554 control the tens-transfer pawls for the registers 16 and 17. The respective cam edges 552, 553 and 554 are shaped so that they may control their respective registers separately, and the cam disk 550 is controlled for this purpose.

Connected to cam disk 550 (Fig. 16) by a stud and slot connection is an arm 580 fixed to a shaft 581, said arm being urged clockwise as viewed in Fig. 16 by a spring 582. Also fixed to shaft 581 is a bell crank 583 one arm of which is connected to a link 584 slidably mounted on a stationary stud 585 and provided with a stud 586 positioned behind the edge of lever 587. The latter is connected by a link 588 and crank 589 to the shaft 146 that is oscillated during each machine cycle.

Normally the parts occupy the position of Fig. 16 where the spring 582 is prevented from moving arm 580 to move cam disk 550 by reason of the fact that stud 586 on link 584 is immediately behind lever 587. But, as the machine is given a cycle, lever 587 moves away from stud 586, whereupon the spring 582 may act. The cam disk 550 is then moved differentially according to which of the total levers 540, 541, or 542 has been moved.

The other arm of the bell crank 583 carries a stud 590 positioned to contact one of four shoulders 591, 592, 593, or 594 on an abutment arm 595 fixed to the shaft 596. This shaft extends across the machine and, at the end adjacent the total levers, it has a short bail 597 fixed to it. The total levers 540, 541 and 542 have forwardly extending portions 600 on them as shown in Fig. 16. These extensions are proportioned so that when the levers are moved to total taking position, the respective surfaces or shoulders 592, 593 or 594 are moved to active position relative to stud 590, depending upon whether the lever 540, 541 or 542 has been moved.

When no total lever is moved, the shoulder 591 is in the position of Fig. 16, and the cam disk 550 can not be moved by spring 582 during the machine cycle. Thus the parts remain in normal position and none of the tens-transfer pawls are locked.

When the total lever 540 for the main register 15 is moved to total-taking position, the shoulder 592 is moved to active position. The bell crank 583, together with shaft 581, arm 580 and disk 550, may then be moved one step to move the cam edge 552 so that it will free the stud 555 on latch 556. But the latches 570 and 571 will not be freed.

When the other total levers 541 and 542 are moved to total taking position, the shoulders 593 and 594, respectively, are moved to active position, which allows cam disk 550 to be moved two and three steps, respectively, to cause the cam edges 553 and 554 to free their latches, respectively.

Thus, the tens-transfer pawls for the respective registers are locked when the total taking levers for the respective registers are moved to total taking position.

Sample of work

Figure 15:
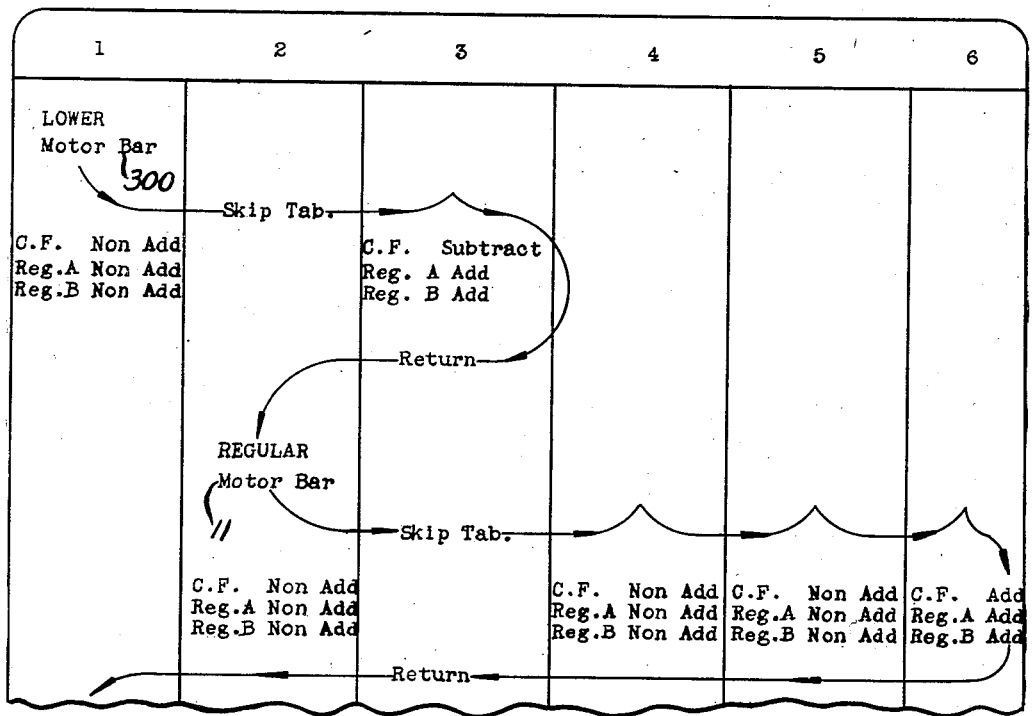
Fig. 15 is a view showing a sample of one form of work that may be performed.

A sample of work of which the machine is capable is shown in Fig. 15. For this work the machine is conditioned and functions as follows:

In the No. 1 columnar position of the carriage, the special motor bar 300 is depressed. The sensing member for the main register is allowed to move downward, upon downward movement of the regular motor bar, to "non-add" the main register. The sensing members for the multiple registers do not move and these registers remain in "non-add" condition. The sensing member for the tabulating mechanism is allowed to move downward to condition the tabulating mechanism to cause the carriage to skip the No. 2 column. The sensing member for repeat machine operations is allowed to move down to condition the machine for repeat operations. The machine is given a cycle of operation during which the item that is entered on the amount keys is printed but not entered in any of the registers. During the latter part of this cycle, the carriage automatically moves to its No. 3 column, column No. 2 being skipped.

When the carriage arrives at its No. 3 column, it is automatically given a cycle of operation owing to the fact that the repeat machine mechanism has been conditioned as just explained. This cycle does not start, however, until after the carriage has reached this position, owing to the interlock previously described. In this position of the carriage, the sensing member for the main register is allowed to move to condition the latter for subtraction so that the item is subtracted from this register, and the sensing members for the multiple registers are allowed to move to the "add" position so that the item is added in each of the latter registers. The repeat machine operation sensing member is not moved, with the result that a third operation of the machine will not take place. Accordingly, during this second cycle of operation, the item will be subtracted from the main register, it will be added in each of the multiple registers, and, at the end of the operation, the carriage will be automatically returned to its No. 2 column, a cam 330 (Fig. 9) being provided to arrest the carriage in this position.

The machine then stops, whereupon the operator makes another entry on the amount keys, after which he depresses the regular motor bar. In this position of the carriage, the sensing member for the main register is allowed to move to "non-add" the latter and the sensing members for the multiple registers do not move so that no addition occurs in either of them. The sensing member controlling the tabulating mechanism is conditioned to cause the carriage to skip the No. 3 column. At the end of the cycle of operation, the carriage automatically moves to its No. 4 column. The sensing member for the repeat operations is allowed to move in column 2 and then continues to move in columns 4 and 5 so that the machine operates automatically in columns 4, 5 and 6, after which it is automatically returned to the right, viewing the machine from the front, and machine operations stop. In columns 4 and 5 all of the registers are non-added, while in column 6 all of them are in "add" condition.

The above operations are particularly useful in connection with certain types of public utility billing where certain of the items are to be repeated, but it is to be understood that the machine can be conditioned for many other types of work by varying the controls heretofore described.

It is to be understood that the construction shown is for purposes of illustration only and that variations may be made in it without departing from the spirit and scope of the invention as defined by the appended claims.

The claims on the broad subject matter of the sensing type of automatic controls are contained in my copending application Ser. No. 51,263 filed November 23, 1935.

I claim:

1. A calculating machine of the class described having a traveling paper carriage normally movable from column to column across said machine, function indexing means indexed by said carriage, a plurality of function control devices, a plurality of sensing devices governing said control devices and operable to sense said indexing means, means for causing said sensing devices to be moved to sensing position relative to said indexing means to thereby selectively condition said function control devices for a predetermined program of machine functions and means preventing movement of said sensing devices to sensing position while said carriage is moving between its columnar positions.

2. A calculating machine of the class described adapted to be conditioned to perform selected ones of a multiplicity of different functions, a travelling paper carriage, a drum freely rotatable by said carriage synchronously to the travel of said carriage, a plurality of detachable indexing stops at stations on said drum corresponding to the columnar positions of said carriage, a plurality of sensing devices normally out of the paths of said indexing stops and operable to sense said indexing stops, a plurality of function controlling devices governed by said sensing devices, and means for causing said sensing devices to sense said indexing stops after said drum has been indexed to thereby condition said function controlling devices for a program of machine functions in accordance with the position of the paper carriage.

3. A calculating machine of the class described having means normally operable to give the machine single cycles of operation, repeat means for causing said machine to be given repeat cycles of operation, a paper carriage movable to different columnar positions across the machine, printing mechanism for making type impressions on record material supported on said carriage, function indexing means movable by said carriage synchronously to the movements of said carriage from column to column to place said indexing means in its several indexed positions in accordance with the column in which printing occurs, and sensing means normally out of the range of said indexing means and operable to sense said indexing means after it has been indexed by said carriage, said sensing means including devices controlling said repeat means to cause said machine to go through a predetermined number of cycles of operation.

4. A calculating machine of the class described having a motor driving means, a motor bar for causing said driving means to give said machine cycles of operation, a paper carriage movable to different columnar positions across the machine, indexing means movable by said carriage proportionately to the movements of said carriage from column to column to place said indexing means in different indexing positions in accordance with the column in which printing occurs, a plurality of function control devices, a plurality of sensing devices governing said control devices and operable to sense said indexing means to selectively condition said function control devices for a predetermined program of machine functions in accordance with the positions occupied by said carriage, means operated by depression of said motor bar for causing said sensing devices to sense said indexing means, and means for preventing depression of said motor bar from causing a cycle of machine operation until said sensing devices have moved to sensing position.

ROBERT L. MULLER.